United States Patent
Saito

(10) Patent No.: US 8,230,241 B2
(45) Date of Patent: Jul. 24, 2012

(54) STORAGE POWER SUPPLY SYSTEM, STORAGE DEVICE, AND CONTROL THEREOF

(75) Inventor: Shinsuke Saito, Aichi (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 487 days.

(21) Appl. No.: 12/506,229

(22) Filed: Jul. 20, 2009

(65) Prior Publication Data
US 2009/0276643 A1 Nov. 5, 2009

Related U.S. Application Data

(63) Continuation of application No. PCT/JP2008/050698, filed on Jan. 21, 2008.

(30) Foreign Application Priority Data

Jan. 23, 2007 (JP) .................................. 2007-012468

(51) Int. Cl.
*G06F 1/30* (2006.01)
(52) U.S. Cl. ....................................................... 713/300
(58) Field of Classification Search .................... 713/300
See application file for complete search history.

(56) References Cited

U.S. PATENT DOCUMENTS

| 5,928,368 | A * | 7/1999 | Jardine et al. ..................... 714/22 |
| 6,195,754 | B1 * | 2/2001 | Jardine et al. .................. 713/324 |

FOREIGN PATENT DOCUMENTS

| JP | H05-019899 | A | 1/1993 |
| JP | 2003-036125 | A | 2/2003 |
| JP | 2004-070393 | A | 3/2004 |
| JP | 2005-078174 | A | 3/2005 |
| JP | 2005-253243 | A | 9/2005 |

OTHER PUBLICATIONS

Chinese Office Action dated Apr. 26, 2011.
Japan Notice of the reason for refusal dated Aug. 4, 2011.
International Search Report for PCT/JP2008/050698 dated Apr. 15, 2008.
PCT Written Opinion of the International Searching Authority for PCT/JP2008/050698 dated Apr. 15, 2008.

* cited by examiner

*Primary Examiner* — Kim Huynh
*Assistant Examiner* — Eric Chang
(74) *Attorney, Agent, or Firm* — Yokoi & Co., USA., Inc.; Toshiyuki Yokoi

(57) ABSTRACT

The present invention discloses a storage power supply system includes a first storage device coupled with a network, a second storage device coupled with the network and an uninterrupted power supply. The uninterrupted power supply comprises a backup circuit that supplies backup power when commercial power supply is interrupted. The uninterrupted power supply comprises a power supply state signal generation circuit that generates a power supply state signal indicating a state of the power. The power supply state signal includes a backup state signal indicating a supply of backup power. The first storage device performs a self-processing corresponding to a state in which backup power is supplied when the backup state signal generated by the power supply state signal generation circuit is inputted. The second storage device performs a self-processing corresponding to a state in which backup power is supplied in response to the input of the backup state signal from the power supply state signal generation circuit to the first storage device.

9 Claims, 16 Drawing Sheets

STORAGE POWER SUPPLY SYSTEM, STORAGE DEVICE, AND CONTROL THEREOF

CROSS-REFERENCES TO RELATED APPLICATIONS

This Application is a CONTINUATION application claiming the benefit of priority of the co-pending International Patent Application No. PCT/JP2008/050698 with an international filing date of 21 Jan. 2008 that designated the United States, which claims the benefit of priority of Japanese Patent Application No. 2007-012468, filed Jan. 23, 2007, the entire disclosures of all Applications are expressly incorporated by reference in their entirety herein.

BACKGROUND OF THE INVENTION

1. Field of the Invention

The present invention relates to a storage power supply system in which power from an uninterrupted power supply is supplied to a storage device, a storage device constituting the storage power supply system, and control thereof.

2. Description of Related Art

In order to protect a network attached storage (NAS), power from an uninterrupted power supply (UPS) is supplied to the NAS. Because the supply time of backup power that is supplied when a commercial power supply is interrupted is limited, the protection is performed by connecting the UPS and NAS by a serial signal cable, generating by the NAS a signal indicating that power supply is interrupted during power supply interruption, and shutting down the NAS on the basis of this signal.

Japanese Patent Application Laid-open No. 2005-253243 describes using an interface that enables a plurality of simultaneous communication operations between an uninterrupted power supply and devices that receive power therefrom and performing the communication by using power cables that connect the uninterrupted power supply and devices that receive power therefrom.

A UPS is provided only with one, or at maximum two connectors for connecting a signal cable for transmitting a signal indicating power supply interruption. For this reason, in a case where a large number of NAS are connected to a network and power from the UPS is supplied to these NAS, there are NAS that cannot input the signal indicating power supply interruption when the power supply interruption occurs and such NAS cannot be protected by shutting down the NAS during power supply interruption.

With the feature described in Japanese Patent Application Laid-open No. 2005-253243, because the UPS has to be provided with a power line network interface, the UPS circuit becomes complex and the UPS for general use cannot be utilized.

BRIEF SUMMARY OF THE INVENTION

The present invention discloses to enable with a simple system configuration the processing corresponding to a state in which backup power is supplied when the commercial power supply is interrupted even in a storage device in which the state in which backup power is supplied cannot be directly recognized from the uninterrupted power supply.

One aspect of the present invention provides a storage power supply system, comprising:
a first storage device coupled with a network;
a second storage device coupled with the network;
an uninterrupted power supply that supplies power to the first storage device and the second storage device;
the uninterrupted power supply comprises a backup circuit that supplies backup power when commercial power supply is interrupted;
the uninterrupted power supply comprises a power supply state signal generation circuit that generates a power supply state signal indicating a state of the power;
the power supply state signal includes a backup state signal indicating a supply of backup power;
the first storage device is coupled with the power supply state signal generation circuit;
the first storage device performs a self-processing corresponding to a state in which backup power is supplied when the backup state signal generated by the power supply state signal generation circuit is inputted; and
the second storage device performs a self-processing corresponding to a state in which backup power is supplied in response to the input of the backup state signal from the power supply state signal generation circuit to the first storage device.

Another aspect of the present invention provides a master storage device (first storage device) that is coupled with a network having a slave storage device (second storage device) coupled with the network, comprising:
the master storage device receives power supply from an uninterrupted power supply that has a power supply state signal generation circuit that generates a power supply state signal indicating a state of supplied power;
the master storage device causes the slave storage device to execute a processing corresponding to a state in which backup power is supplied when the power supply state signal generated by the power supply state signal generation circuit is in a state indicating the supply of backup power; and
the master storage device performs a self-processing corresponding to a state in which backup power is supplied when the power supply state signal generated by the power supply state signal generation circuit is in a state indicating the supply of backup power.

Another aspect of the present invention provides a slave storage device (second storage device) that is coupled with a network having a master storage device (first storage device) coupled with the network, comprising:
the slave storage device receives power supply from an uninterrupted power supply that has a power supply state signal generation circuit that generates a power supply state signal indicating a state of supplied power;
the power supply state signal includes a backup state signal indicating a supply of backup power; and
the slave storage device performs a self-processing corresponding to a state in which backup power is supplied in response to input of the backup state signal from the power supply state signal generation circuit to the master storage device.

A LAN (Local Area Network) such as Ethernet (registered trademark) can be applied to the network.

The power supply state signal indicating a state of power supplied by the uninterrupted power supply includes a signal indicating that backup power is supplied, a signal indicating that backup power is not supplied, a signal indicating whether backup power is supplied, a signal indicating that commercial power is supplied, a signal indicating that commercial power is not supplied, a signal indicating whether commercial power is supplied, and a signal indicating a remaining time in which backup power can be supplied. The state indicating the supply of backup power includes a state indicating that backup power is supplied, a state indicating that commercial power is not supplied, and a state indicating that backup power has reduced.

For example, a shutdown processing can be applied as the processing corresponding to a state in which backup power is supplied.

The operation of performing a processing in response to the input of the signal of the state indicating the supply of backup power from the power supply state signal generation circuit to the first storage device includes an operation of outputting information or a signal corresponding to the supply of backup power when the first storage device inputs the signal of the state indicating the supply of backup power to the second storage device and performing the corresponding processing such as shutdown processing of the second storage device that has inputted the information or signal, and an operation of generating information or signal corresponding to the supply of backup power and performing the corresponding processing such as shutdown processing of the second storage device that has read the information or the signal when the first storage device inputs the signal of the state indicating the supply of backup power in response to an inquiry from the second storage device.

The information (including the signal) corresponding to the supply of backup power includes information indicating that backup power has been supplied and information indicating that backup power has reduced. For example, information that indicates a shutdown instruction can be applied.

The present invention can be also applied to a control method including processes corresponding to the features of the above-described system or device, a program that causes a computer to execute the functions corresponding to the features of the above-described system or device, a computer readable recording medium where the program is recorded, and a program product using the program.

The invention relating to the above-described control method, control program, recording medium, and program product demonstrates the above-described operation and effect.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

An embodiment of the present invention will be described below in the following order: (1) configuration of a storage power supply system, (2) operation and action of the storage power supply system, and (3) modification examples of the storage power supply system.

(1) Configuration of a Storage Power Supply System Including a Storage Device

Figure 1:
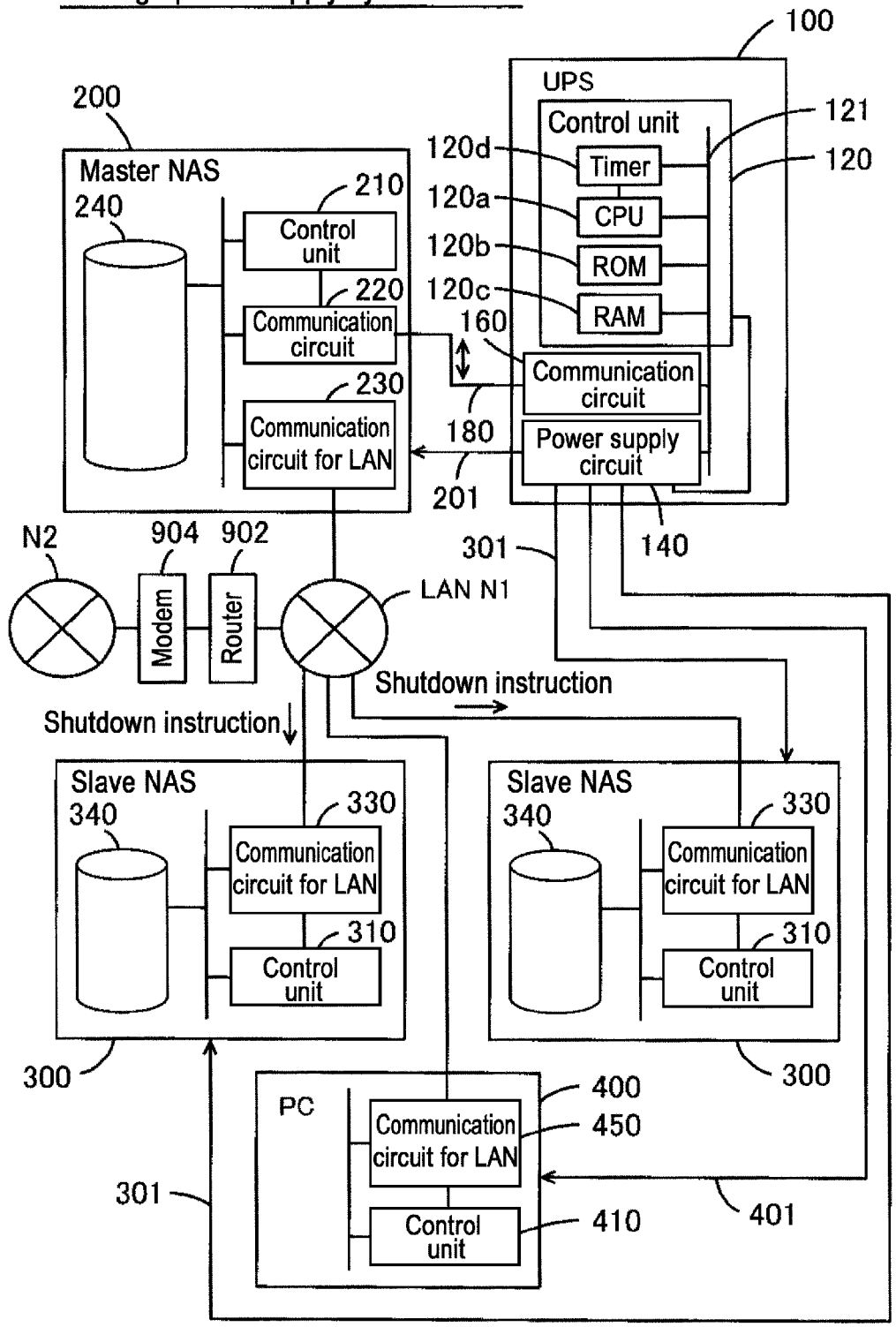
FIG. 1 is an exemplary illustration of a block diagram illustrating schematically a configuration of a storage power supply system.

FIG. 1 shows the configuration of a storage power supply system 1000 of an embodiment of the present invention. The system 1000 is provided at least with a master NAS (master storage device, first storage device) 200 that is connected via an internal network N1 that can communicate information in both directions and a slave NAS (slave storage device, second storage device) 300 and is also provided with a UPS (uninterrupted power supply) 100 that supplies power at least to the NAS 200, 300. A LAN such as Ethernet (trade name) is a typical example of the internal network. The internal network may be a wire network such as a wire LAN or a wireless network such as a wireless LAN. Where power can be supplied to NAS from the same UPS, the internal network may be a WAN (Wide Area Network) or Internet. In the present embodiment, a case will be explained in which the network N1 is a LAN.

The internal network may be connected only to the NAS 200, 300, or may be connected to a personal computer (PC) 400, mobile telephone, PDA (Personal Digital Assistant), a game machine, etc.

In the present embodiment, two slave NAS 300 are provided, but only one slave NAS or a plurality thereof may be also provided. Furthermore, only one master NAS is provided, but a plurality thereof may be also provided. The power supply objects of the UPS 100 may be only the NAS 200, 300, or the objects may also include the PC 400, as in the present embodiment.

The network N1 is connected to an external network N2 such as Internet via a router 902 and a modem 904. The router 902 is a device that protocol convert the data flowing in the internal network N1 and data flowing in the external network N2 and relays the converted data. The router 902 is provided, for example, with a LAN adapter circuit that is physically connected to the internal network N1, a circuit that realizes transmission and reception of data between this LAN adapter circuit and the modem, and a CPU (Central Processing Unit), a ROM (Read Only Memory), RAM (Random Access memory), or a timer circuit for transmitting and receiving data and controlling the processing of assigning an IP (Internet Protocol) address to the NAS 200, 300. The modem 904 is a modulation-demodulation device that converts digital data received from the router 902 into signals for a telephone line (including signals for optical fiber communication), transmits the resultant signals to the external network N2, converts signal received from the external network N2 into digital data, and outputs the converted data to the router 902.

The above-described configuration makes it possible to transmit and receive via the external network N2 the data from the PC 400 or the like that is connected to the internal network and also access NAS and the like connected to the internal network from a PC or a cellular phone connected to the external network N2.

The UPS 100 of the present embodiment is provided only with a connector for connecting a signal cable 180 that has a signal line that transmits a signal indicating power supply interruption. The master NAS 200 and the UPS 100 are connected by a signal cable, whereas the slave NAS 300 and the UPS 100 are not connected by a signal cable. In the slave NAS 300, a shutdown processing is performed on the device itself in response to an input of a signal indicating power supply interruption from the UPS 100 to the master NAS 200.

The UPS 100 is provided to a control unit 120, a power supply circuit 140, and a communication circuit 160 that are connected to each other. Power from the power supply circuit 140 can be supplied to the NAS 200, 300 and PC 400, and signals can be transmitted and received between the UPS 100 and the master NAS 200 via the signal line of the signal cable 180. In the control unit 120, a CPU 120a, semiconductor memory units 120b, c, a timer circuit 120d, and the like are connected to a predetermined signal bus 121 and can mutually input and output information. The CPU 120a performs a processing of executing a program written in the ROM 120b and controls the operation of the entire UPS.

Figure 2:
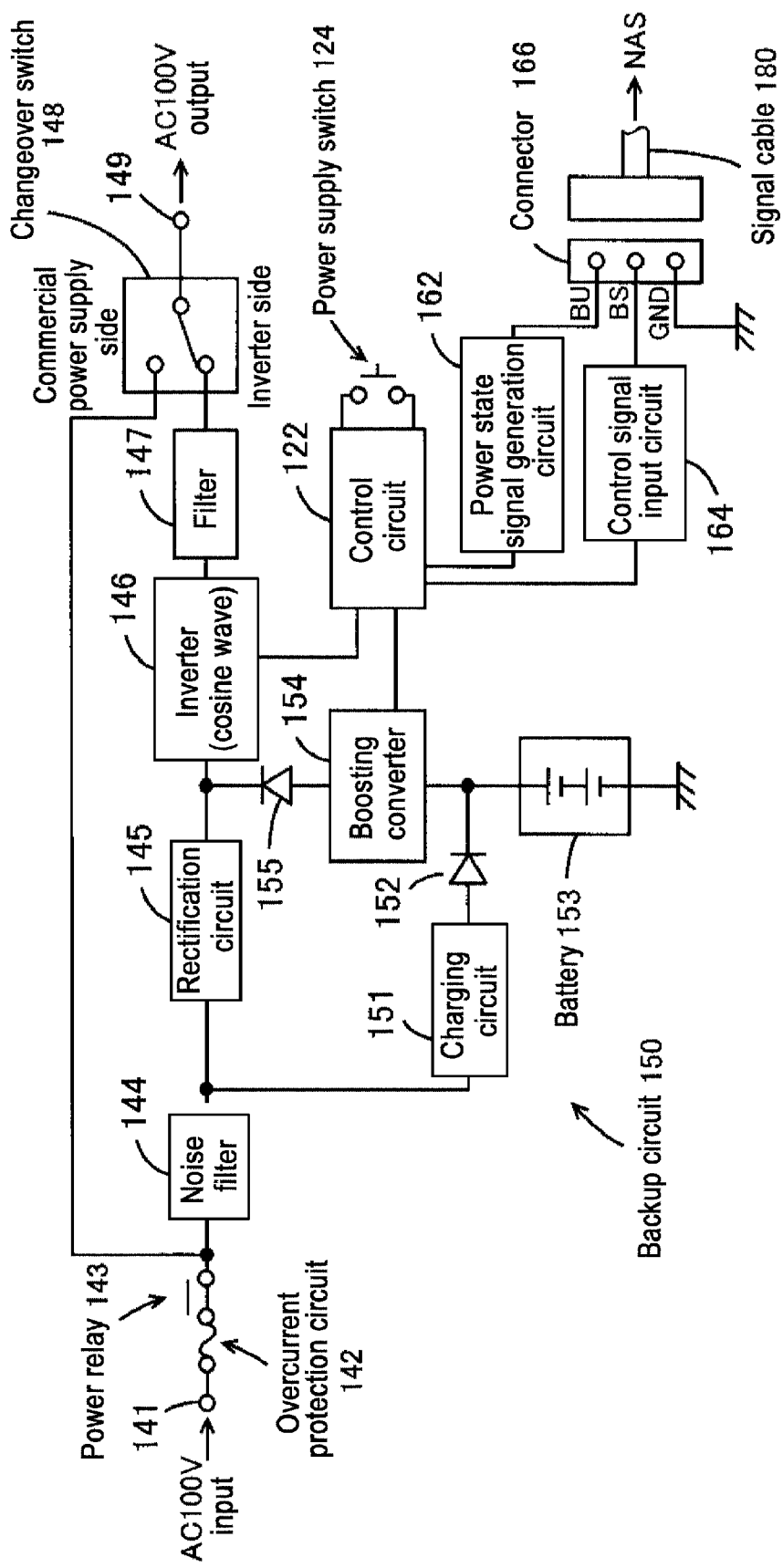
FIG. 2 is an exemplary illustration of a block diagram illustrating schematically a configuration of an uninterrupted power supply.
Figure 3:
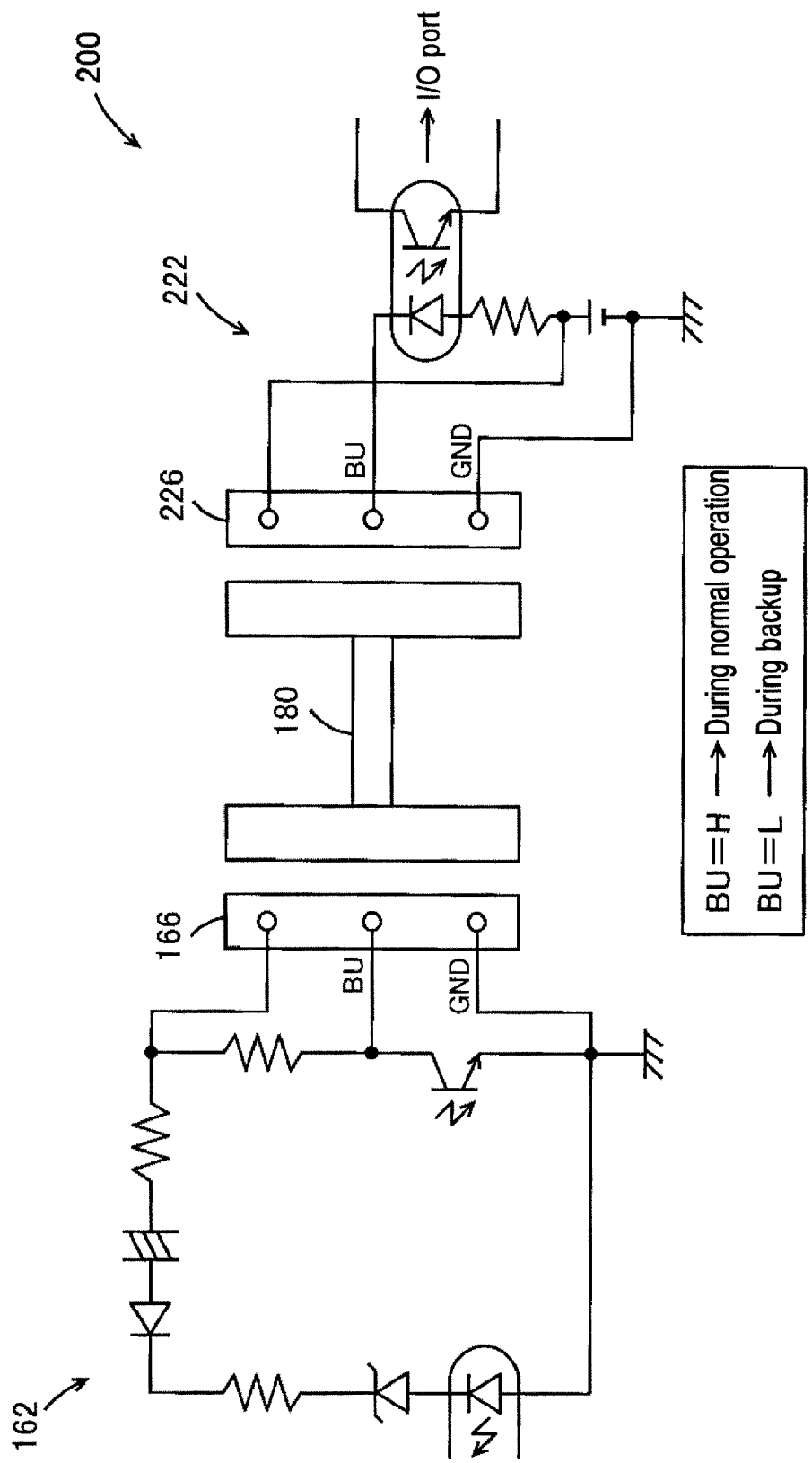
FIG. 3 is an exemplary illustration of a circuit diagram illustrating a power supply state signal generation circuit and a signal input circuit.
Figure 4:
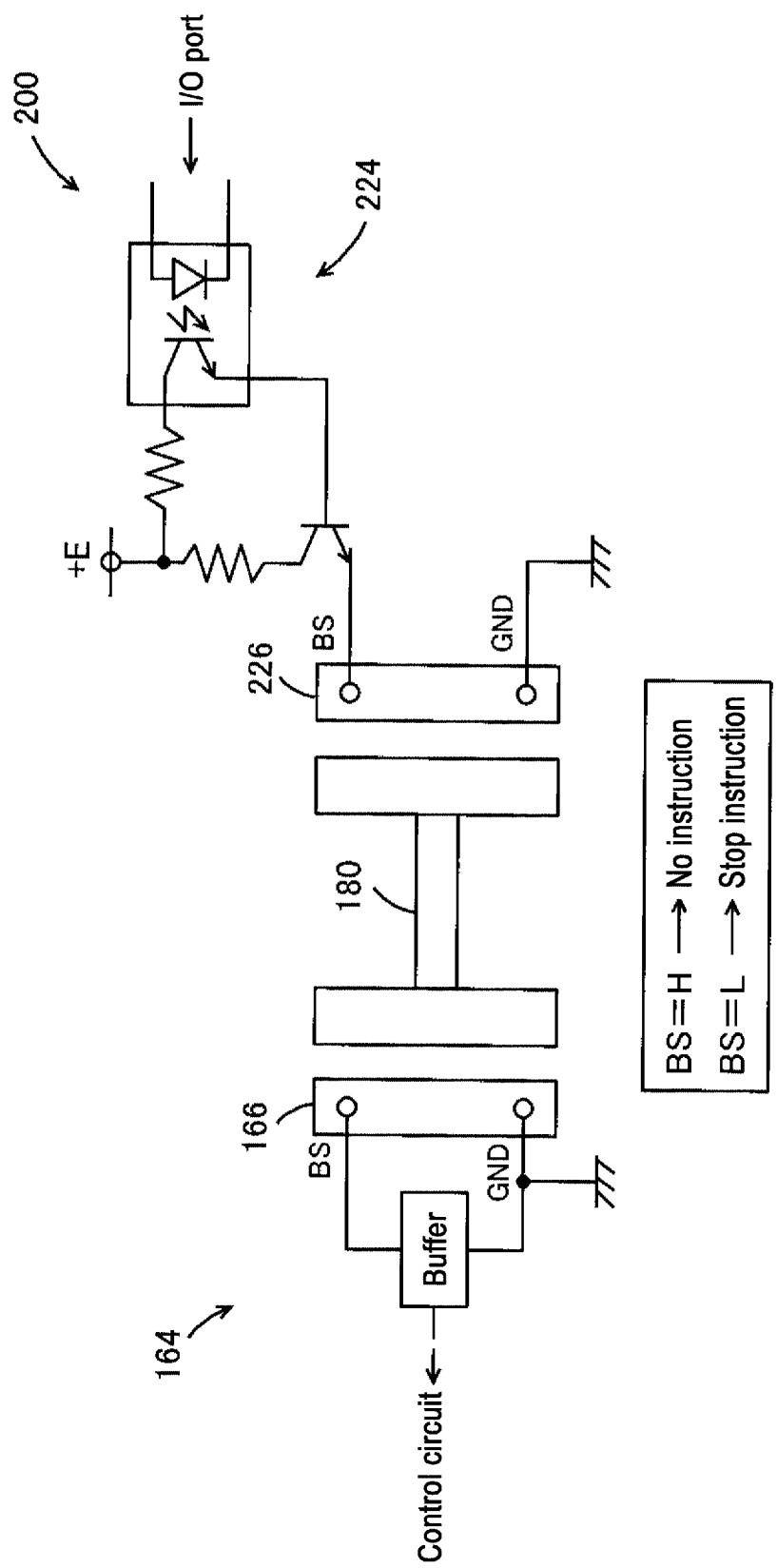
FIG. 4 is an exemplary illustration of a circuit diagram illustrating a control signal input circuit and a signal output circuit.

FIG. 2 shows schematically a configuration example of the UPS 100. FIG. 3 shows an example of circuit diagrams of a power supply state signal generation circuit 162 of the UPS and a signal input circuit 222 of the master NAS. FIG. 4 shows an example of circuit configurations of a control signal input circuit 164 of the UPS and a signal output circuit 224 of the master NAS. It goes without saying that the hardware configuration of the UPS is not limited to that shown in the figures.

FIG. 2 shows a UPS of a constant inverter power supply system, but the UPS to which the present invention can be applied may be a UPS of a line interruptive system and a UPS of a constant commercial power supply system. The UPS 100 is provided with units 122, 124 that constitute the control unit 120, units 141 to 149, 151 to 155 that constitute the power supply circuit 140, and the units 162, 164, 166 that constitute the communication circuit 160. The backup circuit 150 that supplies backup power when the commercial power supply is interrupted is constituted by units 151 to 155 included in the power supply circuit. The power supply state signal generation circuit 162 generates a power supply state signal (BU signal) indicating a state of power supplied by the UPS. As shown in FIG. 3, the BU signal is a negative logic signal that has a high (H) level during normal operation in which backup power is not supplied and a low (L) level when backup power is supplied (during power supply interruption). Therefore, the BU signal of the L level serves as a backup state signal of a state indicating the backup power supply (signal indicating power supply interruption). Because the UPS directly uses the commercial power supply when started or when power capacity is exceeded, while using a power output of the inverter as a base, the normal operation time includes the time of power output by the inverter and the time of commercial power supply output. The BU signal may also be a positive logic signal, or a signal assuming a conductive state during normal operation and an open state in which no current flows during backup power supply, or a signal for which the conductive state and open state are inverted with respect to those of the above-described signal.

In addition to the BU signal that indicates whether backup power is supplied, the power supply state signal indicating a state of power supplied by the UPS includes a signal (referred to as A1 signal) that indicates that backup power is supplied, a signal indicating only that backup power is not supplied (referred to as A2 signal), a signal that indicates only that commercial power is supplied (referred to as A3 signal), a signal that indicates only that commercial power is not supplied (referred to as A4 signal), a signal that indicates whether commercial power is supplied (referred to as A5 signal), and a signal that indicates a remaining time in which backup power can be supplied (referred to as A6 signal). The respective state of A1 to A6 signals that indicates the supply of backup power can be a state in which the UPS generates the A1 signal, a state in which the UPS does not generate the A2 signal, a state in which the UPS does not generate the A3 signal, a state in which the UPS generates the A4 signal, a state that indicates that the UPS does not supply commercial power, and a state that indicates that backup power of the UPS has decreased.

The control signal input circuit 164 can input a control signal (BS) for controlling the operation of the UPS itself. The UPS 100 stops the supply of backup power when the BS signal that causes the supply of backup power to stop is inputted to the control signal input circuit 164. The BS signal is a negative logic signal that has a low (L) level when the supply of backup power is stopped and a high (H) level in other cases, as shown in FIG. 4. The BS signal of the L level can be also called a signal indicating a shutdown instruction for the UPS. The BS signal may also be a positive logic signal, or a signal assuming an open state when the supply of backup power is stopped and a conductive state in other cases, or a signal for which the conductive state and open state are inverted with respect to those of the above-described signal.

When the UPS shown in FIG. 2 is started or when power capacity is exceeded, a changeover switch 148 is switched to commercial power supply, AC 100 V is inputted to a power supply input unit 141 such as a power supply input terminal, and power is supplied to an external device such as the NAS 200, 300 via an overcurrent protection circuit 142 such as a fuse, a power source relay 143, the switch 148, and the power source output unit 149 such as a power source output terminal. During power supply by the inverter, the switch 148 is switched to the inverter side, AC 100 V is inputted to the power source input unit 141, and power is supplied to an external device such as the NAS 200, 300 via the overcurrent protection circuit 142, power source relay 143, noise filter 144, rectifying circuit 145, inverter 146, filter 147, switch 148, and power output unit 149. In this case, a battery 153 that is a rechargeable battery is charged from the noise filter 144 via a charging circuit 151 and a diode 152. During backup power supply, the switch 148 is switched to the inverter side, and power is supplied to an external device such as the NAS 200, 300 via a battery 153, a boosting converter 154, a diode 155, the inverter 146, filter 147, switch 148, and power output unit 149.

Because the time of backup power supply from the battery 153 is limited, the UPS 100 is provided with the power supply state signal generation circuit 162 shown in FIG. 3 or a control signal input circuit 164 shown in FIG. 4. The power supply state signal generation circuit 162 is connected to the control circuit 122 and generates and outputs the BU signal under the control by the control circuit. The control signal input circuit 164 is connected to the control circuit 122, inputs the BS signal, and outputs the inputted signal to the control circuit 122. The control circuit 122 conducts a processing of stopping the supply of backup power (for example, a processing of switching the switch 148 to the commercial power side) when the BS signal is L (backup power supply stop instruction).

Here, the output unit of the power supply state signal generation circuit 162 or the input unit of the control signal input circuit 164 is a connector 166 of general use for serial communication, and the input unit of the signal input circuit 222 or the output unit of the signal output circuit 224 of the master NAS is also a connector 226 of general use for serial communication. The connectors 166, 226 are connected by a serial signal cable 180 of general use for serial communication, and when power supply is terminated, the master NAS is shut down and protected based on the BU signal generated by the UPS. Thus, the master NAS 200 is connected by the same signal cable 180 to the power supply state signal generation circuit 162 and the control signal input circuit 164.

A signal cable conforming to a USB (Universal Serial Bus) standard, a signal cable conforming to a RS-232C standard, or the like can be used as the aforementioned serial signal cable. It goes without saying that a connector conforming to the USB standard, a connector conforming to the RS-232C standard, or the like can be used as the connector for serial communication. Signals flowing in the signal cable may be signals of an H-level or L-level contact point system.

As shown in FIG. 2, the master NAS 200 of the present embodiment is provided with a control unit 210 (211 to 214 in FIG. 5), a communication circuit 220, a communication circuit 230 for LAN, a storage unit 240, and the like. The slave NAS 300 is provided with a control unit 310 (311 to 314 in FIG. 5), a communication circuit 330 for LAN, a storage unit 340, and the like. The PC 400 is provided with a control unit 410 (411 to 414 in FIG. 5), a communication circuit 450 for LAN, and the like. These devices 200, 300, and 400 can transmit and receive data between each other via the communication circuits 230, 330, and 450 for LAN.

Figure 5:
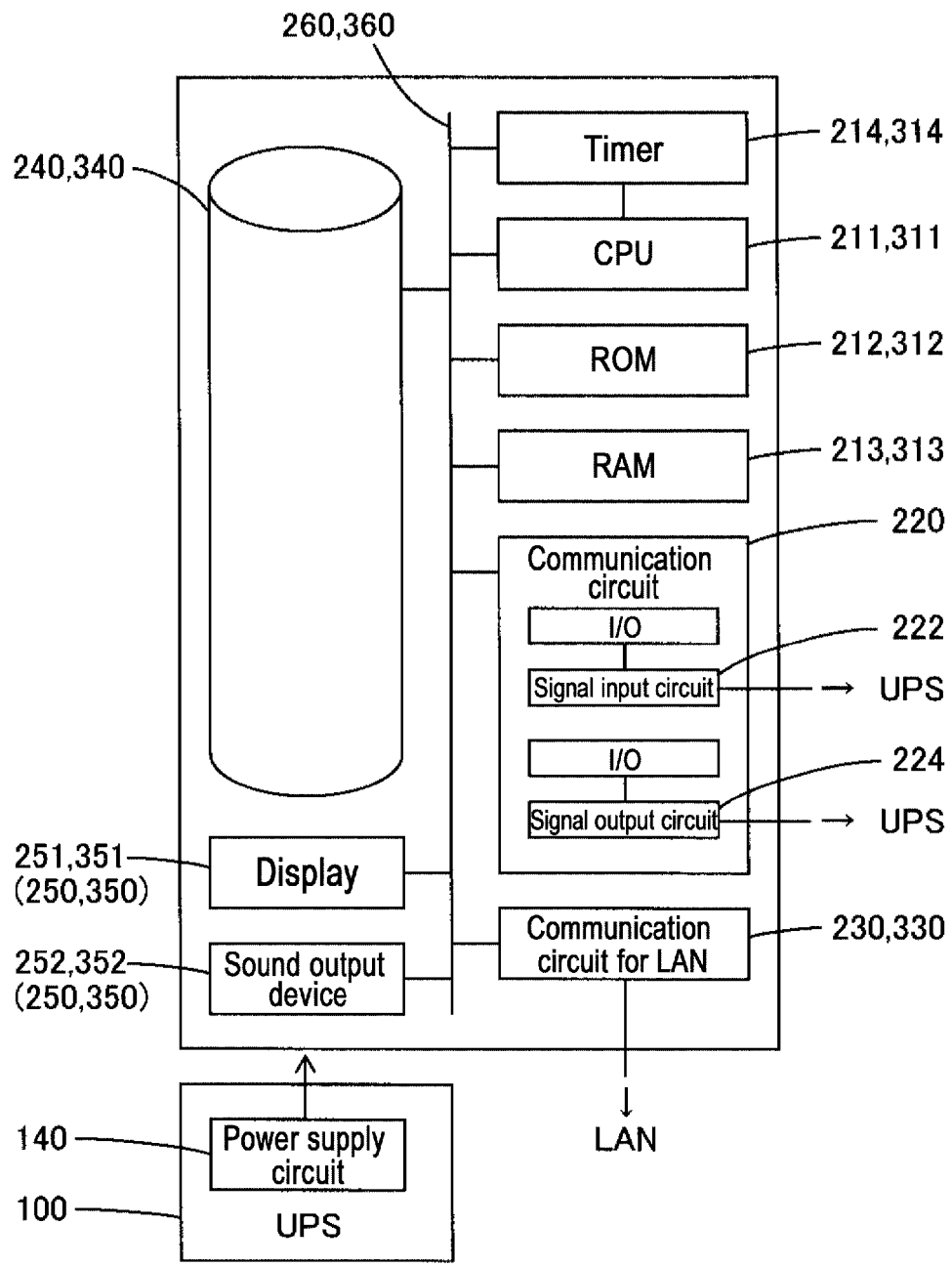
FIG. 5 is an exemplary illustration of a block diagram illustrating a hardware configuration of a storage device together with a UPS.

FIG. 5 is a block diagram showing an example of hardware configuration of the NAS 200, 300 together with UPS. Power cords 201, 301 of the NAS 200, 300 are connected to the power supply circuit 140 of the UPS, and the NAS 200, 300 operate by receiving power supply from the power supply circuit 140. In the master NAS 200, the CPU 211, semiconductor memories 212, 213, timer circuit 214, communication circuit 220, communication circuit 230 for LAN, storage unit 240, and output unit 250 are connected to a predetermined system bus 260, and can be input and output information to and from each other. IN the slave NAS 300, the CPU 311, semiconductor memories 312, 313, timer circuit 314, communication circuit 320, communication circuit 330 for LAN, storage unit 340, and output unit 350 are connected to a predetermined system bus 360 and can input and output information to and from each other. In terms of hardware, the communication circuit 220 may be provided in the slave NAS, and in this case the signal cable 180 is not connected to this communication circuit. The output devices 250, 350 may not be provided, but display devices 251, 351 such as liquid crystal displays, sound output devices 252, 352 that output a beep sound, and the like can be used. The CPU 211, 311 perform a processing of executing appropriately a control program of a storage device or a control program of reading information of various types from the storage units 230, 240 to the RAM 213, 313 correspondingly to the programs written in the ROM 212, 312, and the operation of all the NAS is controlled.

In the NAS 200, 300, the below-described processing is conducted in parallel, for example, by a time division system that uses timer interruption by the timer circuit 214, 314. The communication circuits 230, 330 for LAN are connected to a network N1 and can perform bidirectional communication via the network N1, for example, by TCP/IP. In the present embodiment, when the commercial power supply is interrupted, data transmission and reception between the NAS 200, 300 is conducted according to a special protocol different from the TCP/IP. When data transmission and reception between the NAS is conducted according to a special protocol, the data may be encrypted for transmission by a predetermined encryption processing using an operation-inputted password in order to prevent data leak or corruption, and the received encrypted data may be restored to the original data by a predetermined decoding processing. The storage units 240, 340 have an information storage medium such as a hard disk and a drive such as a hard disk drive that reads and writes the information from and to the information storage medium, and various control programs or information of various kinds are stored on the information storage medium. A magnetic recording medium such as a hard disk, a CD-ROM, a non-volatile semiconductor memory, a volatile semiconductor memory that has power backup, and the like can be used as the information storage medium that stores the information.

Figure 6:
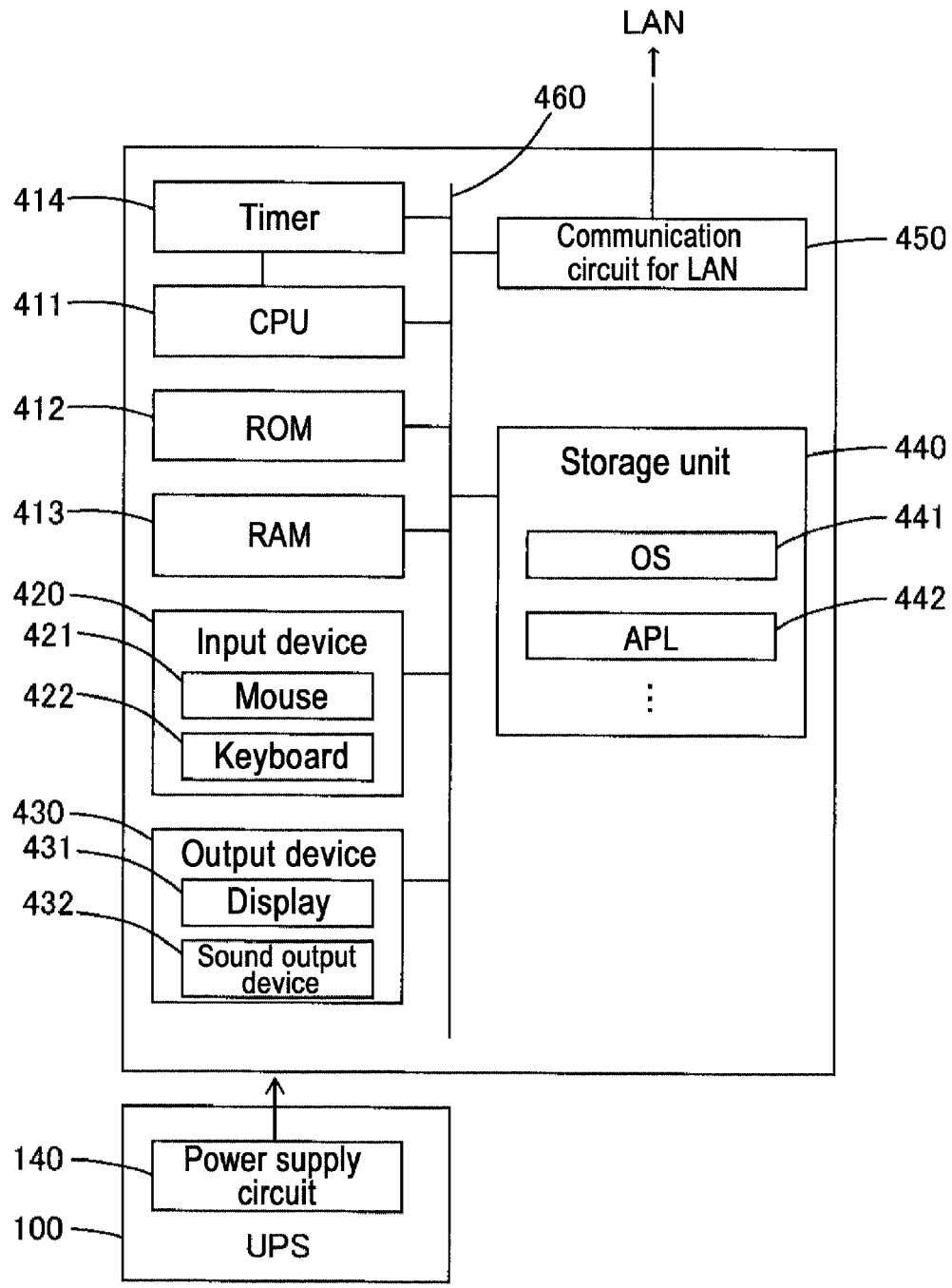
FIG. 6 is an exemplary illustration of a block diagram illustrating a hardware configuration of a personal computer together with the UPS.

FIG. 6 shows an example of hardware configuration of the PC 400 together with the UPS. A power cord 401 of the PC 400 is connected to the power supply circuit 140 of the UPS, and the PC 400 operates by receiving power supply from the power supply circuit 140. In the PC 400, a CPU 411, a semiconductor memory device 412, 413, a timer circuit 414, an input device 420, an output device 430, a storage unit 440, a communication circuit 450 for LAN, and the like are connected to a predetermined system bus 460 and can input and output information to and from each other. The CPU 411 performs appropriately the processing of executing a control program by reading an operating system (OS) 441, an application program (APL) 442 such as a browser, and information of various kinds from the storage unit 440 to the RAM 413 and controls the operation of the entire PC according to the control program written in the ROM 412.

In the PC 400, the below-described processing is conducted in parallel, for example, by a time division system that uses timer interruption by the timer circuit 414. The communication device 450 for LAN is connected to the network N1 and can perform bidirectional communication via the network N1, for example by TCP/IP. The input device 420 has a pointing device 421 such as a mouse or a keyboard 422 as an operation input device and receives the operation input from a user. The output device 430 has a display device 431 such as a display and a sound output device 432 such as a sound output unit as information output devices and outputs information to the user by display or sound output. It goes without saying that a printing device such as a printer may be connected to the PC and information may be outputted by printing the information out with the printing device. The storage unit 440 has an information storage medium such as a hard disk and a drive such as a hard disk drive that reads and writes information from and to the information storage medium. OS 231, APL 232, or information of various types is recorded on the information storage medium. A magnetic storage medium such as a hard disk, a CD-ROM, a nonvolatile semiconductor memory, a volatile semiconductor memory with power backup, or the like can be used as the information storage medium that stores the information.

Figure 7:
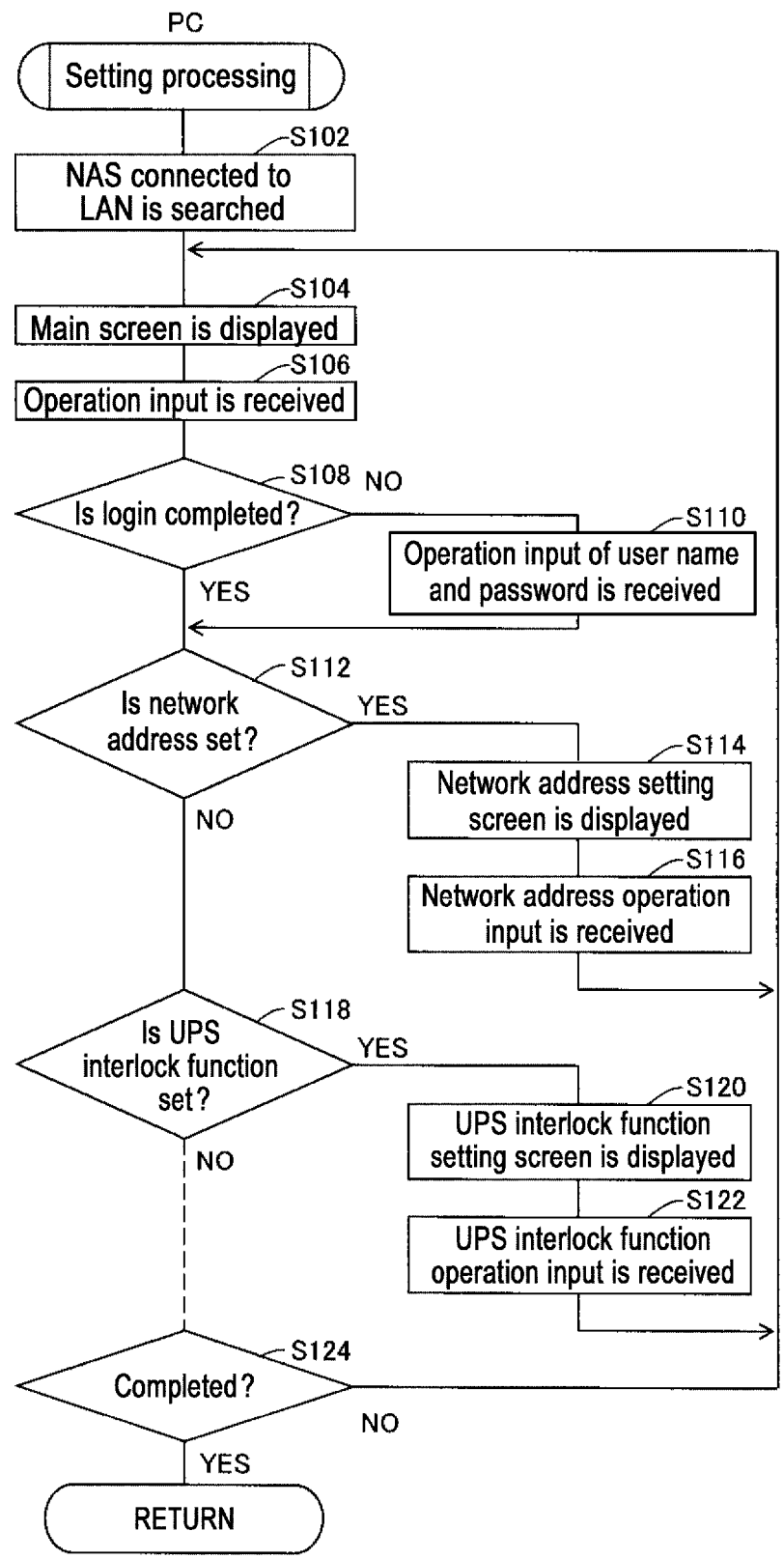
FIG. 7 is an exemplary illustration of a flowchart illustrating a setting processing performed by the personal computer.

(2) Operation and Action of the Storage Power Supply System Including the Storage Device FIG. 7 shows an example of setting processing performed by the PC 400. This process is not necessary for carrying out the present invention, but with such processing, whether the NAS will be a master NAS or a slave NAS can be easily set by input to the PC.

Where the PC starts the setting processing, a search for a NAS connected to the LAN (local network N1) is initially performed (step S102; the word "step" is hereinbelow omitted). For example, information for inquiring the presence of a device connected to the LAN is broadcast transmitted to the LAN and a name of the device that responds to the inquiry information is received. The broadcast transmission is performed, for example, by using a special broadcast address that is used for transmitting data to all the devices connected to the LAN and performing a processing of transmitting information meaning an inquiry to the broadcast address.

Figure 8:
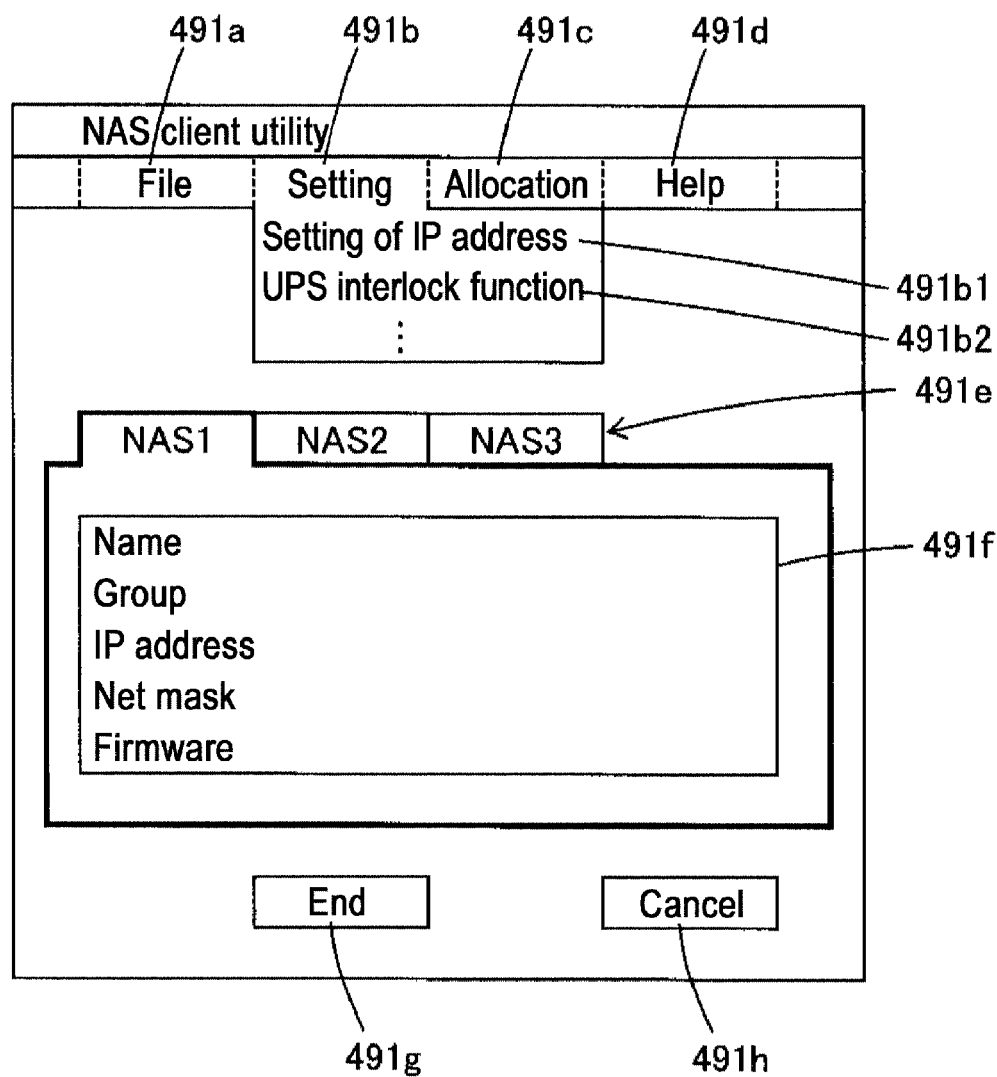
FIG. 8 illustrates a display example of the main screen.

Then, based on the search results, a main screen 491 shown in FIG. 8 is displayed on the display (S104). The display 491 is provided with menu selection regions 491a to d, a device selection region 491e for selecting the found device, a device information display region 491f that displays information relating to the selected device, operation buttons 491g, h, and the like. In the device selection region 491e, the names of found devices are displayed in a tab format. In the present embodiment, because one master NAS and two slave NAS are connected to the LAN, the names of three NAS are displayed. Where any one of the name tabs displayed in the region 491e is selected and operated with a pointing device or the like, information relating to the device with the selected name is displayed in the device information display region 491f. The display information includes the device name, a group set for the device, an IP address (network address) set for the device, a net mask set for the device, firmware set for the device, and the like. Where any one of the menu selection region of the menu selection regions 491a to d is selected and operated, a submenu of the selected menu selection region is displayed. For example, where a "SETTING" region 491b is selected and operated, submenus such as menus 491b1, 491b2 shown in the figure are displayed.

Where the name tab of the device selection region 491e is appropriately selected and operated, any one of the submenus of the menu section regions 491a to d is selected and operated or either of the buttons 491g, h is operated, an operation input is received from the PC user (S106). In the present embodiment, in a case where a selection operation of a submenu of the menu selection region is received for the first time after the processing has been started, a login processing is performed to confirm the user name and password. Accordingly, it is determined whether the login is completed (S108) and in a case where the login is not completed, the processing of S112 and subsequent steps is conducted only when an operation input of the correct user name and password is received from the keyboard or the like (S110). In a case where the correct user name and password have not been operation inputted, the processing is ended. The processing of S108 can be conducted, for example, by providing a region for storing the user name and password in a RAM and determining whether the user name and password have been stored in this region. The processing of S110 can be performed, for example, by storing in advance the user name and password of the user that uses the PC in the storage unit 440, displaying a display having an input column into which the user name and password are inputted, and advancing to S112 when the user name and password identical to the stored user name and password are operation inputted in the input column.

Figure 9:
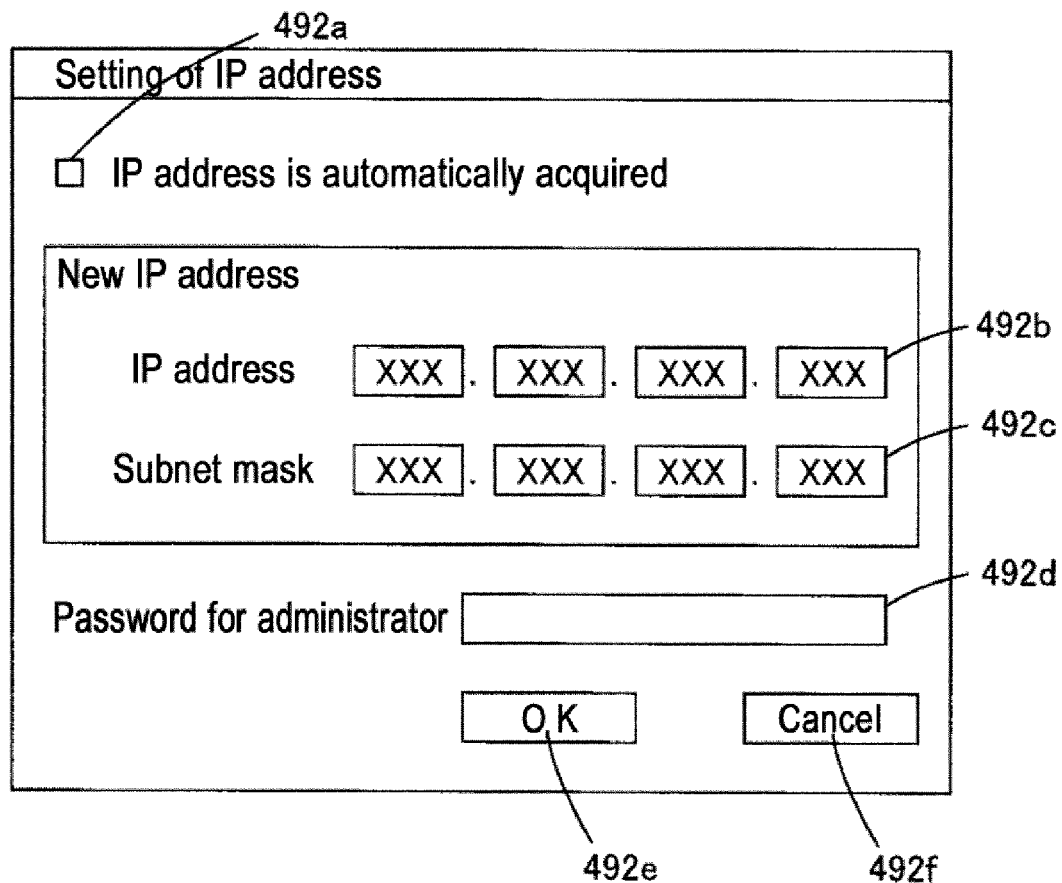
FIG. 9 illustrates a display example of a network address setting screen.

In S112, it is determined whether the "SETTING OF IP ADDRESS" menu has been selected and operated. When the condition is fulfilled, the processing of S114 to S116 is conducted and the processing flow returns to S104. When the condition is not fulfilled, the processing flow advances to S118. In S114, a network address setting display 492 shown in FIG. 9 is displayed. The screen 492 is provided with a check box 492a for selecting whether the IP address is to be acquired automatically, an IP address input column 492b, a subnet mask input column 492c, a password input column 492d for an administrator, various operation buttons 492e, f, and the like. Where an operation of checking the check box 492a is conducted, an IP address is automatically assigned from the router 902 to the device such as NAS selected in the device selection region 491e, and the device stores the assigned IP address in the storage unit. In S116, the operation input of the IP address set for the selected device such as NAS is received from a keyboard or the like. Where the network address is operation inputted in the IP address input column 492b, the IP address that has been operation inputted in the same input column 492b is set for the selected device such as NAS, and the device stores the set IP address in the storage unit. Where the OK button 492e is operated, the processing flow returns to S104.

Figure 10:
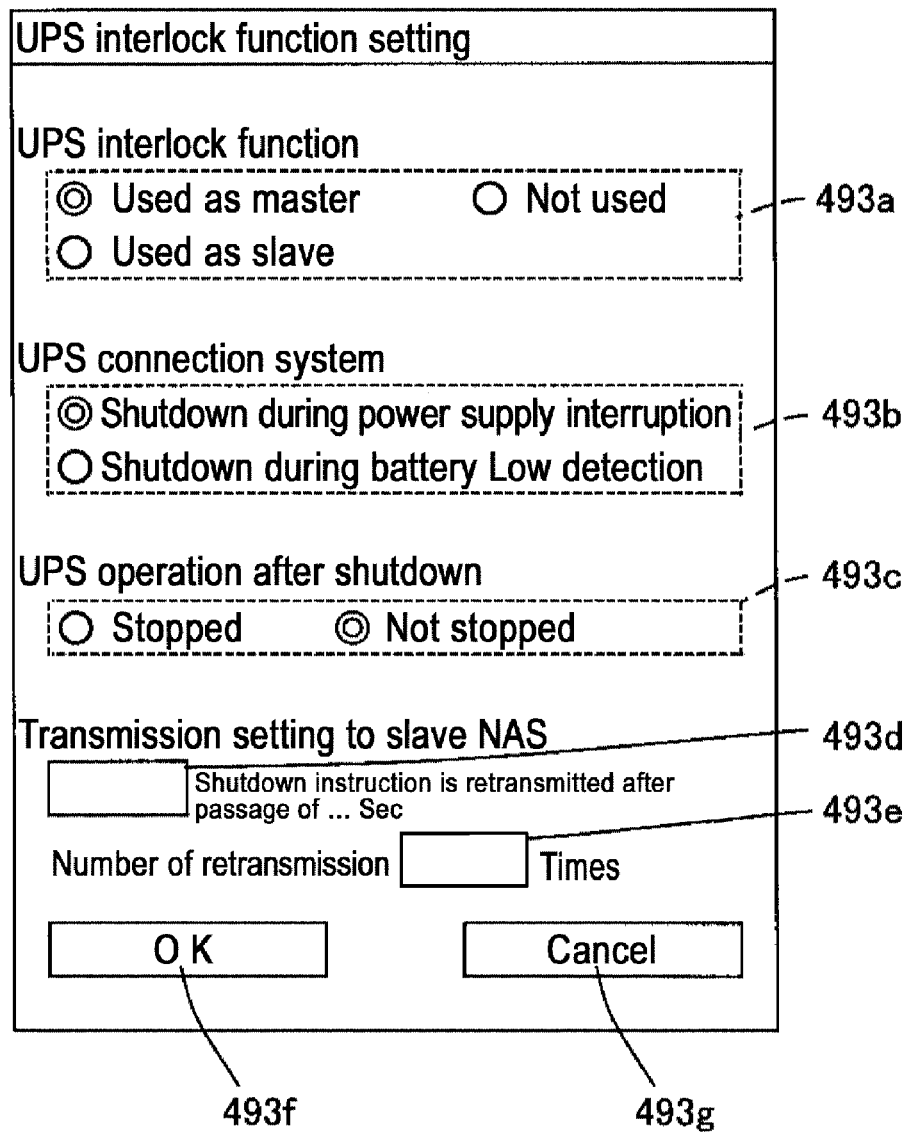
FIG. 10 illustrates a display example of a UPS interlock function setting screen.

In S118, it is determined whether the "UPS INTERLOCK FUNCTION SETTING" menus has been selected and operation. When the condition is fulfilled, the processing of S120 to S122 is performed and the processing flow returns to S104. In S120, a UPS interlock function setting display 493 shown in FIG. 10 is displayed. The screen 493 is provided with a function selection column 493a for selecting whether the device such as NAS that has been selected in the device selection region 49 1e is used as a master device, used as a slave device, or not used at all, a shutdown system selection column 493b for selecting whether to conduct shutdown of the device when power supply is interrupted or when a battery low is detected, a UPS operation selection column 493c for selecting whether to stop or not to stop the power supply of the UPS after the device has been shut down, various buttons 493f, g, and the like. This screen is also provided with a period input column 493d for receiving an operation input with a time interval t1 at which the shutdown instruction is resent to the slave device and a number of times input column 493e for receiving the operation input of an upper limit number of times n1 the shutdown instruction is retransmitted in a case where "USE AS MASTER" is selected in the function selection column 493a. In S122, the operation input of the contents set for the selected device such as NAS is received in the regions 493a to e. Where the device selected in the device selection region 491e is NAS 200, 300, a set input corresponding to the NAS 200, 300 is received in the UPS interlock function setting screen. The contents of the operation input received in the regions 493a to e is set for the device that was set in the device selection region 491e, and the device stores the set contents in a storage unit. Where an OK button 493f is operated, the processing flow returns to S104.

When other submenus are selected, the processing is performed in the same manner as described above. In S124, it is determined whether the present setting processing is completed, for example, by determining whether an end button 491g of the main screen has been operated. Where the setting processing is determined not to be completed, the processing flow returns to S104, and where the setting processing is determined to be completed, the setting processing is ended.

Figure 11:
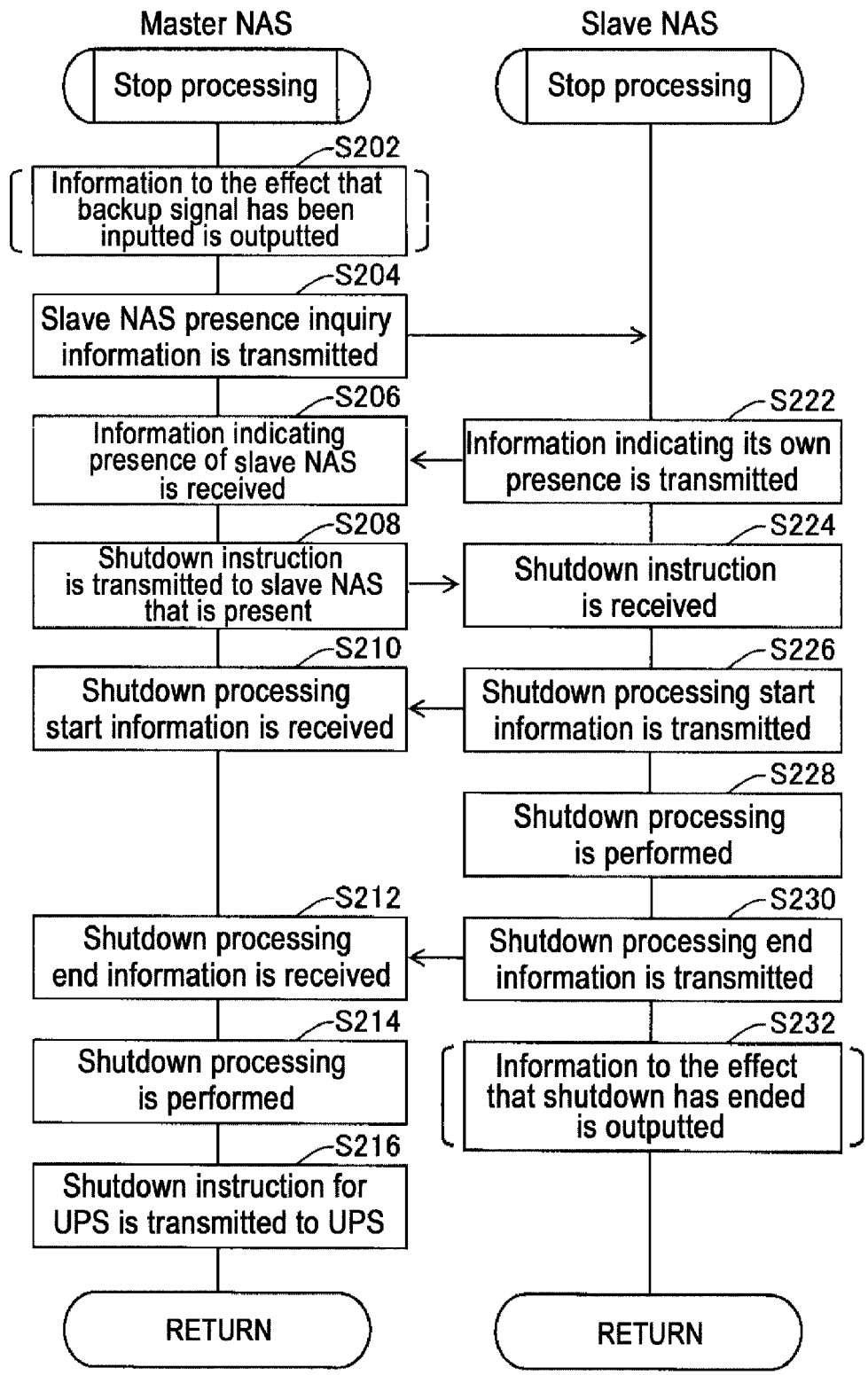
FIG. 11 is an exemplary illustration of a flowchart illustrating stop processing.

FIG. 11 shows an example of stop processing performed in the NAS (master NAS 200) for which "USED AS MASTER" has been selected in the functions election column 493a and in the NAS (slave NAS 300) for which "USED AS SLAVE" has been selected in the functions election column 493a. The stop processing of the master NAS is started when an L-level BU signal indicating the supply of backup power is inputted from the power supply state signal generation circuit 162 of the UPS via the signal cable 180. When the BU signal is at the L level (state indicating the supply of backup power), the master NAS executes a shutdown processing with respect to the slave NAS and a shutdown processing on itself. Meanwhile, the stop processing of the slave NAS is started when inquiry information at the time of performing the stop processing is received from the master NAS via the LAN. The slave NAS performs a shutdown processing on itself in response to the input of an L-level BU signal from the power supply state signal generation circuit 162 to the master NAS. The signal output circuit 224 of the master NAS generates and outputs an H-level BS signal.

Where the BU signal generated by the power supply state signal generation circuit 162 of the UPS is switched from the H level to the L level, the signal input circuit 222 of the master NAS inputs the L-level BU signal. Where the master NAS inputs a L-level BU signal from the UPS, information indicating that a backup signal indicating the supply of backup power has been inputted is outputted to the outside (S202). For example, a display device 251 may display that power supply is interrupted, or a beep sound meaning that power supply is interrupted may be outputted from a sound output device 252. S202 can be omitted.

In S204, information indicated that the presence of the slave NAS is inquired when the stop processing is performed is outputted to the LAN. For example, a processing may be performed of sending inquiry information when the stop processing is performed via the LAN to each NAS that is taken as a slave NAS in the UPS interlock function setting screen shown in FIG. 10. When inquiry information is transmitted to the slave NAS, the IP address of the slave NAS may be designated and the inquiry information may be outputted to the LAN. The same is true hereinbelow.

In the slave NAS 300 that is the transmission destination, the stop processing is started when the information for inquiring the presence of a slave NAS is inputted from the LAN, and the presence information indicating the presence of the slave device itself is outputted to the LAN (S222). For example, a processing may be performed of transmitting the name of the device itself as the presence information to the NAS that is an input destination of the inquiry information. When the presence information is transmitted to the master NAS, the IP address of the master NAS may be designated and the presence information may be outputted to the LAN. The same is true hereinbelow.

In the master NAS, the present information indicating the presence of the slave NAS is inputted from the LAN and the presence information is received from the slave NAS (S206). The master NAS outputs a shutdown instruction (information corresponding to backup power supply thereto) relating to the slave NAS into the LAN and transmits information indicating this instruction to the slave NAS (S208) when this presence information is inputted.

In the slave NAS 300 that is the transmission destination, the shutdown instruction is inputted from the LAN and the shutdown instruction is received from the master NAS (S224). The slave NAS outputs processing start information that indicates the start of shutdown processing to the LAN and transmits this processing start information to the master NAS when the shutdown instruction is inputted (S226). In the master NAS, the processing start information is inputted from the LAN and the processing start information is received from the slave NAS (S210).

Furthermore, the slave NAS performs a shutdown processing (processing corresponding to a state in which backup power is supplied) on itself (S228). This shutdown processing is called a processing of stopping the operating system of the NAS and protecting the storage unit such as a hard disk head. The same processing is performed in a case of the master NAS.

As a result, the slave NAS performs a shutdown processing on itself when the shutdown instruction is inputted. Where this processing is completed, the slave NAS outputs processing end information indicating that the shutdown processing is completed to the LAN and transmits the processing end information to the master NAS (S230). The same slave NAS outputs information to the effect that the shutdown processing has ended to the outside (S232) and ends the stop processing. For example, a display device 351 may display that the shutdown has ended, or a beep sound meaning that the shutdown has ended may be outputted from a sound output device 352. S232 can be omitted. The power source of the slave NAS may be automatically cut off after the stop processing has ended.

Because of the above-described processing, the slave NAS performs a shutdown processing on itself when the information corresponding to the supply of backup power is generated by the master NAS.

In the master NAS the processing end information is inputted from the LAN and the processing end information is received from the slave NAS (S212). Then, the master NAS performs the shutdown processing (processing corresponding to a state in which backup power is supplied) on itself (S214).

As a result, the master NAS performs the shutdown processing on itself when the shutdown instruction is inputted. When this processing is ended, the master NAS outputs an L-level BS signal (backup stop signal that causes the supply of backup power to stop) that UPS shutdown to the control signal input circuit 164 of the UPS, stops the supply of backup power to the UPS 100 (S216), and ends the stop processing. The power source of the master NAS may be automatically cut off after the stop processing.

In the UPS 100, where the BS signal is switched from the H level to the L level, the L-level BS signal is inputted to the control signal input circuit 164 via the signal cable 180.

Figure 12:
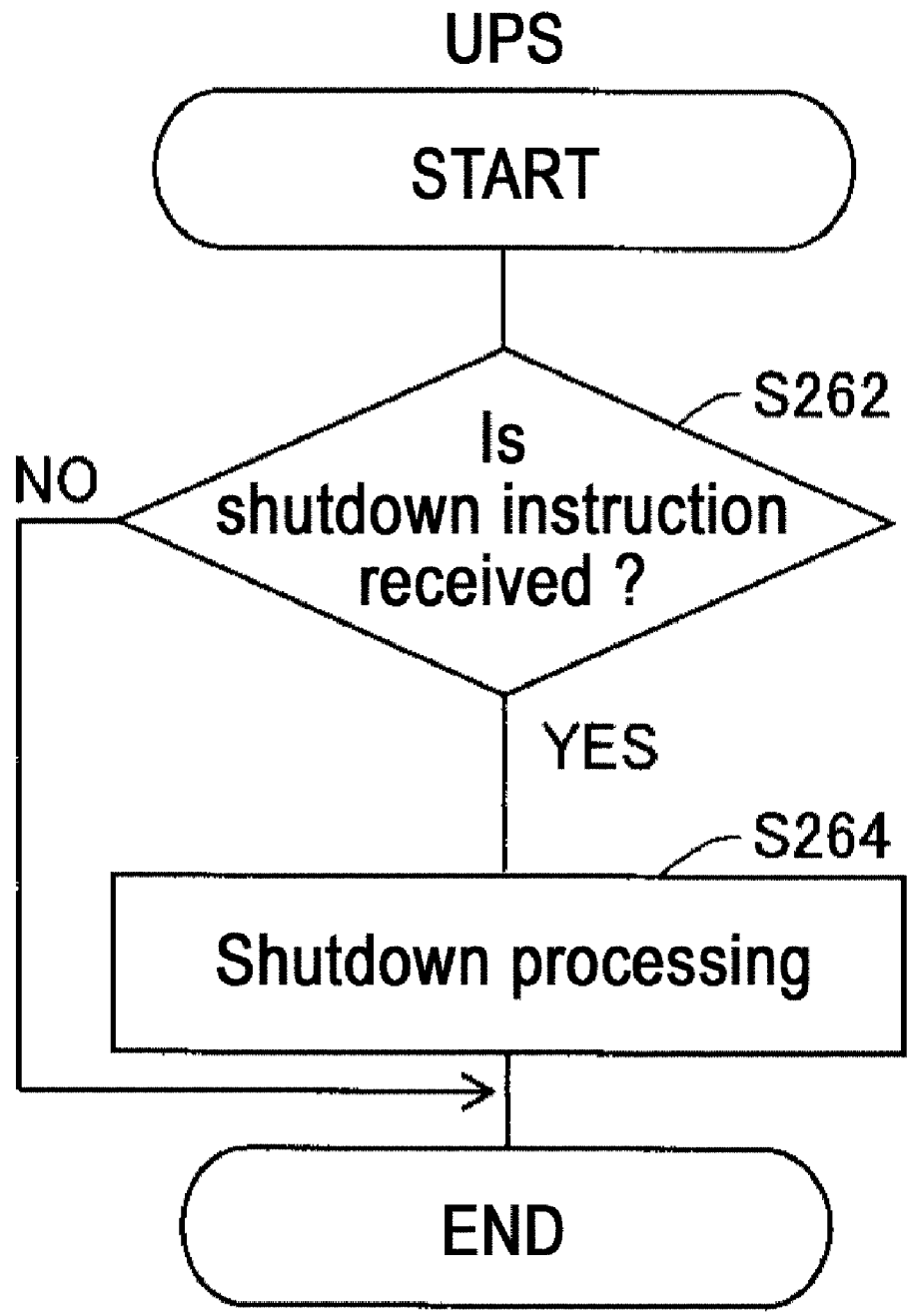
FIG. 12 is an exemplary illustration of a flowchart illustrating the processing performed by the UPS.

FIG. 12 illustrates a processing corresponding to a shutdown instruction that is repeatedly performed by the UPS 100. As shown in the figure, the UPS is configured to determine at all times whether a shutdown instruction (L-level BS signal) meaning that the supply of backup power is caused to be stopped is received from the master NAS (S262) and perform a shutdown processing on itself when the shutdown instruction is determined to have been received (S264). As a result, where the L-level BS signal is inputted to the control signal input circuit 164, a processing that causes the supply of backup power from the UPS to stop is performed. As a result, the UPS stops the supply of backup power.

As a result, by outputting a signal that causes the supply of backup power to stop to the control signal input circuit 164, the master NAS 200 performs the shutdown processing on itself and then stops the supply of backup power to the UPS. Therefore, with the present system 1000, the backup power supply source of the UP 00 can be protected, while protecting the NAS 200, 300.

As described hereinabove, in the slave NAS the shutdown processing is performed in response to the input of a signal of a state indicating the supply of backup power from the power supply state signal generation circuit of the UPS to the master NAS. Furthermore, in the master NAS, information (shutdown instruction) corresponding to the supply of backup power thereto is generated and a processing corresponding to a state in which backup power is supplied to the slave NAS is executed when a signal of a state indicating the supply of backup power is inputted, this signal being generated by the power supply state signal generation circuit 162. Therefore, the shutdown processing corresponding to a state in which backup power is supplied during commercial power supply interruption can be also performed on the slave NAS for which the state in which backup power is supplied is difficult to recognize directly from the UPS, and the slave NAS can be protected during interruption of commercial power supply. In this case, where only the master NAS and slave NAS are connected to the internal network, the master NAS and slave NAS can be protected even when a device other than a NAS, such as a PC, is not connected to the internal network. Therefore, the master NAS and slave NAS are protected with a simple system configuration.

Furthermore, because the shutdown processing corresponding to the state in which backup power is supplied is performed in the master NAS after the presence of the slave NAS connected to the internal network has been recognized, the master NAS can be protected more reliably.

Figure 13:
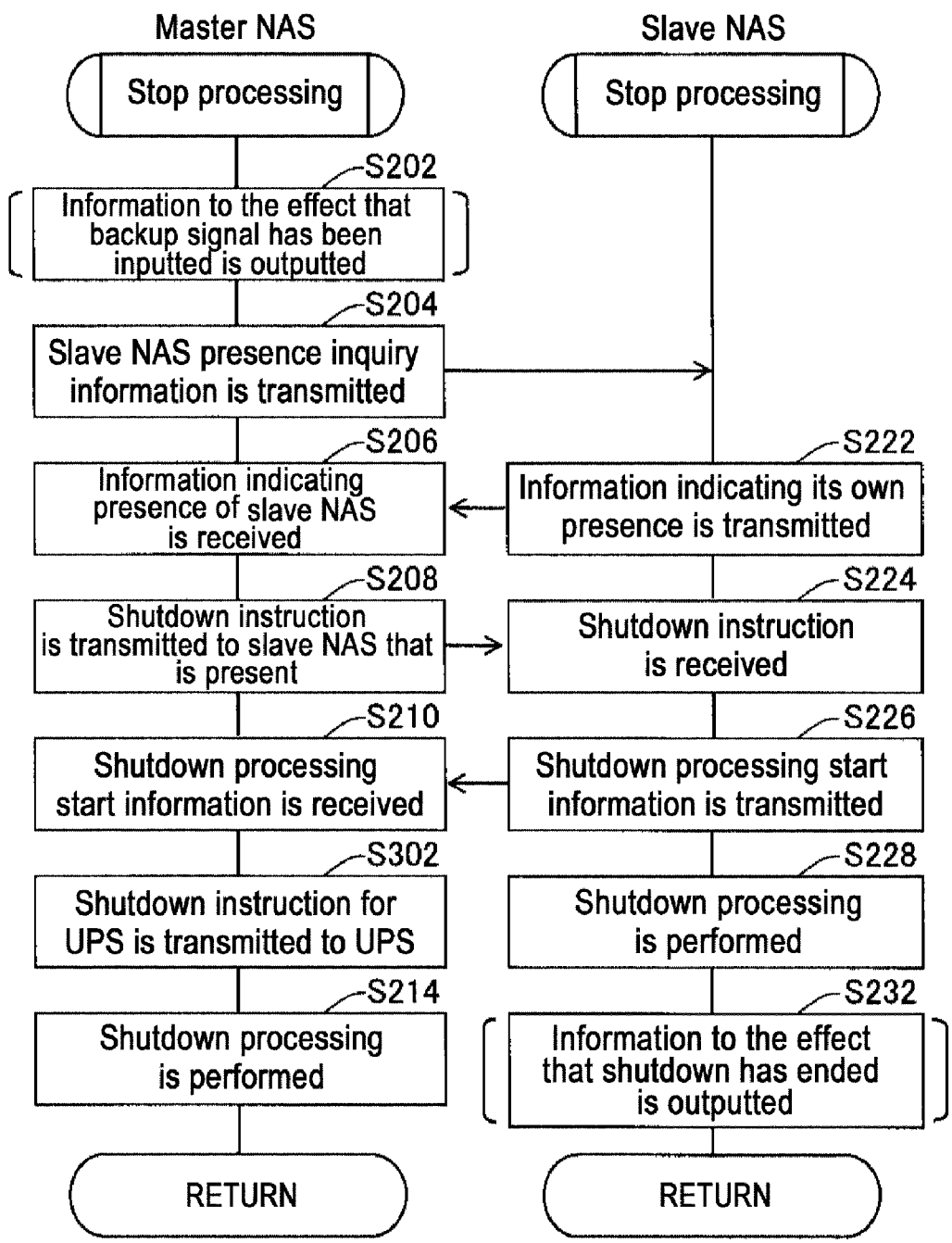
FIG. 13 is an exemplary illustration of a flowchart illustrating stop processing.

Furthermore, as shown in FIG. 13, the shutdown processing in the master NAS and slave NAS can be adequately performed even when the transmission and reception of processing end information that indicates the end of shutdown processing are not performed. In the stop processing shown in the same figure, the processing of S302 is performed instead of the processing of S216 in the master NAS, and the processing of S230 in the slave NAS is omitted.

Where the processing of S202 to S210, S222 to S226 shown in the same figure is performed and the master NAS receives processing start information indicating the start of shutdown processing, the master NAS outputs the L-level BS signal instructing the UPS shutdown to the control signal input circuit 164 of the UPS (S302). As a result, the UPS performs the processing corresponding to the shutdown instruction that is shown in FIG. 12, but because the master NAS ensures a time for performing the shutdown processing, the shutdown processing of the UPS is performed in S264 after waiting for a predetermined time Tu (sec). This time Tu may be longer than a time Tm sufficient for the master NAS and slave NAS to perform the shutdown processing. Furthermore, the UPS may receive the setting input of the time Tu from the master NAS 200, store the received time Tu in the memory 120c or the like, and perform the shutdown processing on itself after waiting for the stored time Tu (sec). Furthermore, it is also possible to receive the operation input of time Tu in the PC 400, transmit the inputted time Tu to the master NAS 200, save the time Tu in the storage unit 240 of the master NAS, transmit the stored time Tu to the UPS, for example, via the serial signal cable 180, and store the transmitted time the memory of the like of the UPS.

In the slave NAS, after the processing start information has been received in S226, the shutdown processing is performed on itself in S228, information to the effect that the shutdown processing is performed is appropriately outputted in S232, and the stop processing is ended. Meanwhile, after the shutdown instruction has been transmitted to the UPS in S302, the master NAS performs the shutdown processing on itself in S214, and the stop processing is ended.

As described hereinabove, the master NAS performs on itself the shutdown processing corresponding to a state in which backup power is supplied and then causes the UPS to stop the supply of backup power by outputting a signal that causes the supply of backup power to stop to the control signal input circuit of the UPS. As a result, the backup power supply source of the UPS can be protected, while protecting the master NAS and slave NAS.

Figure 14:
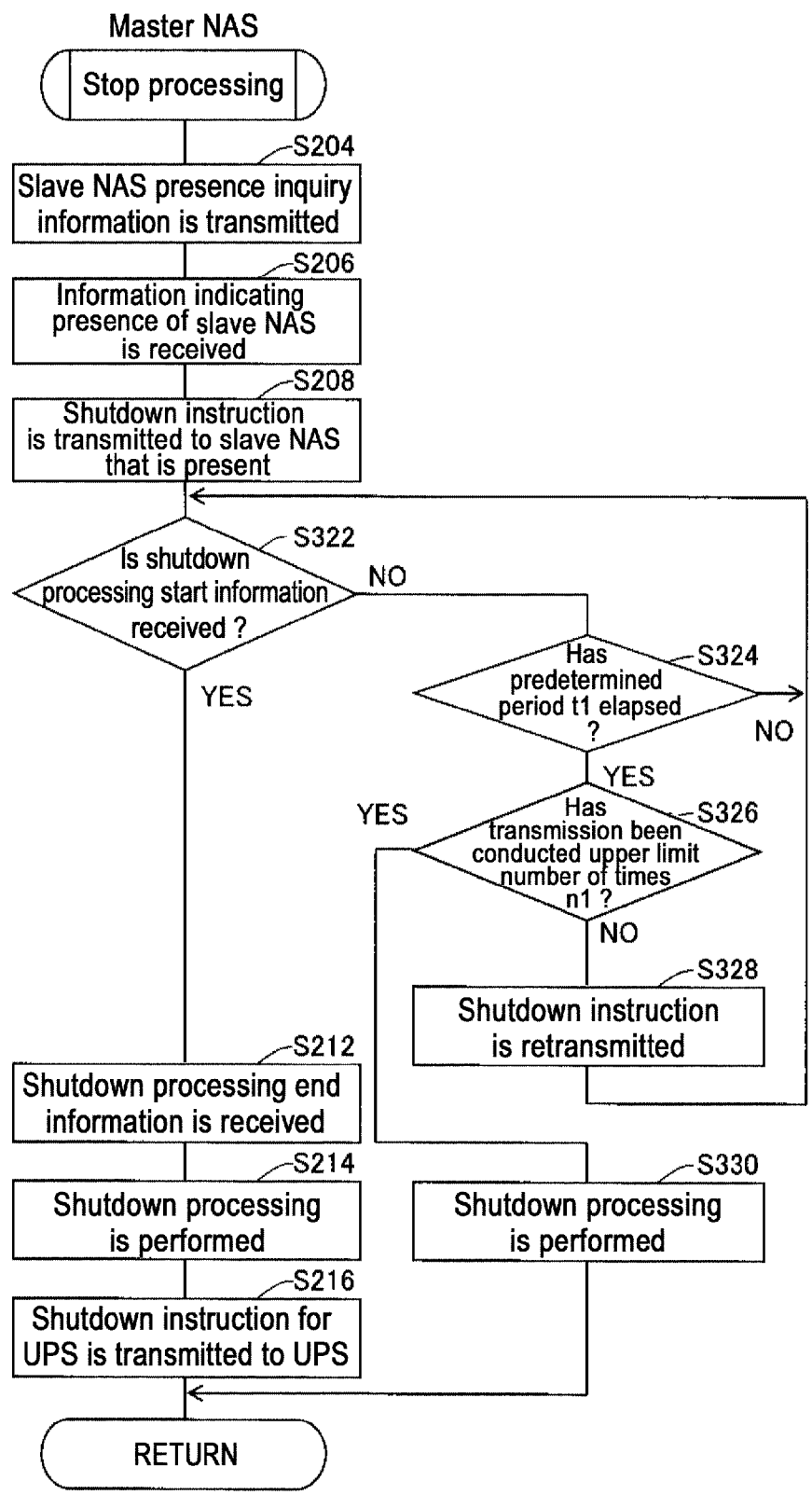
FIG. 14 is an exemplary illustration of a flowchart illustrating stop processing.

Furthermore, as shown in FIG. 14, when it is impossible to confirm that the shutdown processing of the slave NAS connected to the LAN is performed, it is also possible to protect the slave NAS from power source shutdown, without instructing the UPS to shut down. In this figure, only the stop processing of the master NAS is shown. In the slave NAS, the stop processing shown in FIG. 11 is performed.

Where an L-level BU signal is inputted from the power supply state signal generation circuit 162 of the UPS, the master NAS 200 starts the main stop processing and outputs information to the effect that the presence of the slave NAS 300 is inquired to the slave NAS (S204). Where the presence information indicating the presence of the slave NAS is received from the slave NAS (S206) after the inquiry information has been transmitted, the master NAS outputs the shutdown instruction relating to the slave NAS to the slave NAS (S208). In order to perform the below-described processing of S324, S326, the master NAS, for example, stores in RAM 213 a time T1 of the timer circuit 214 corresponding to a point in time at which the shutdown instruction is outputted and substitutes 0 as a count representing the number of times the shutdown instruction is retransmitted. In this case, when the shutdown instruction is inputted, the slave NAS has to output the processing start information indicating the start of shutdown processing to the master NAS and perform the shutdown processing on itself.

The master NAS determines whether the processing start information is received after the shutdown instruction has been transmitted (S322). In a case where the information is determined to have been received, as described hereinabove, the master NAS receives the processing end information that indicates the end of shutdown processing, performs the shutdown processing on itself, outputs an L-level BS signal that instructs the UPS to shut down to the control signal input circuit of the UPS (S212 to S216), and ends the stop processing. Thus, the master NAS performs the shutdown processing on itself and then causes the UPS to stop the supply of backup power by outputting the shutdown instruction to the control signal input circuit via the signal cable.

In a case where the processing start information is not determined in S322 to be received, the master NAS determines whether a predetermined period t1 sec (for example 1 sec) has elapsed since the shutdown instruction has been outputted to the slave NAS (S324). The master NAS can store t1 in the storage unit 240, and the determination processing of S324 can be performed by determining whether the time difference T2−T1 (sec) between the present time T2 of the timer circuit 214 and the above-described stored time T1 is equal to or more than t1. The master NAS returns to S322 in a case where the predetermined period t is determined not to have elapsed and determines whether the shutdown instruction relating to the slave NAS has been transmitted the upper limit number of times n1 (for example, 1 time) in a case whether the predetermined period t1 is determined to have elapsed (S326). The master NAS can store n1 in the storage unit 240, and the determination processing of S326 can be performed by determining whether the count representing the number of retransmissions is equal to or higher than n1. In a case whether the number of transmission is determined to be less than the upper limit number of times n1, the shutdown instruction is retransmitted to the slave NAS that has received the presence information (S328), the count indicating the number of retransmissions is incremented by 1, and the processing flow returns to S322. In a case, where the number of transmissions is determined to be equal to the upper limit number of times n1, the shutdown processing is performed on the storage device itself (S330), and the stop processing is ended, without transmitting the shutdown instruction to the UPS.

Thus, in S322 to S328, the master NAS performs the processing of outputting a shutdown instruction to the slave NAS again the number of times equal to or less than the upper limit number of times n1 when the processing start information is not inputted from the slave NAS within the predetermined period t1 after the shutdown instruction has been outputted. Furthermore, the shutdown processing is performed on the device itself, without outputting the L-level BS signal that causes the supply of backup power to stop to the control signal input circuit 164 when the processing start information is not inputted from the slave NAS within the predetermined period t1 after the processing has been conducted the upper limit number of times n1.

In the present modification example, because the shutdown processing corresponding to a state in which backup power is supplied is reliably performed in the master NAS even when the slave NAS does not respond, the master NAS can be protected more reliably. Furthermore, because the supply of backup power of the UPS is not stopped in a case where the slave NAS does not respond, the slave NAS can be protected more reliably.

Figure 15:
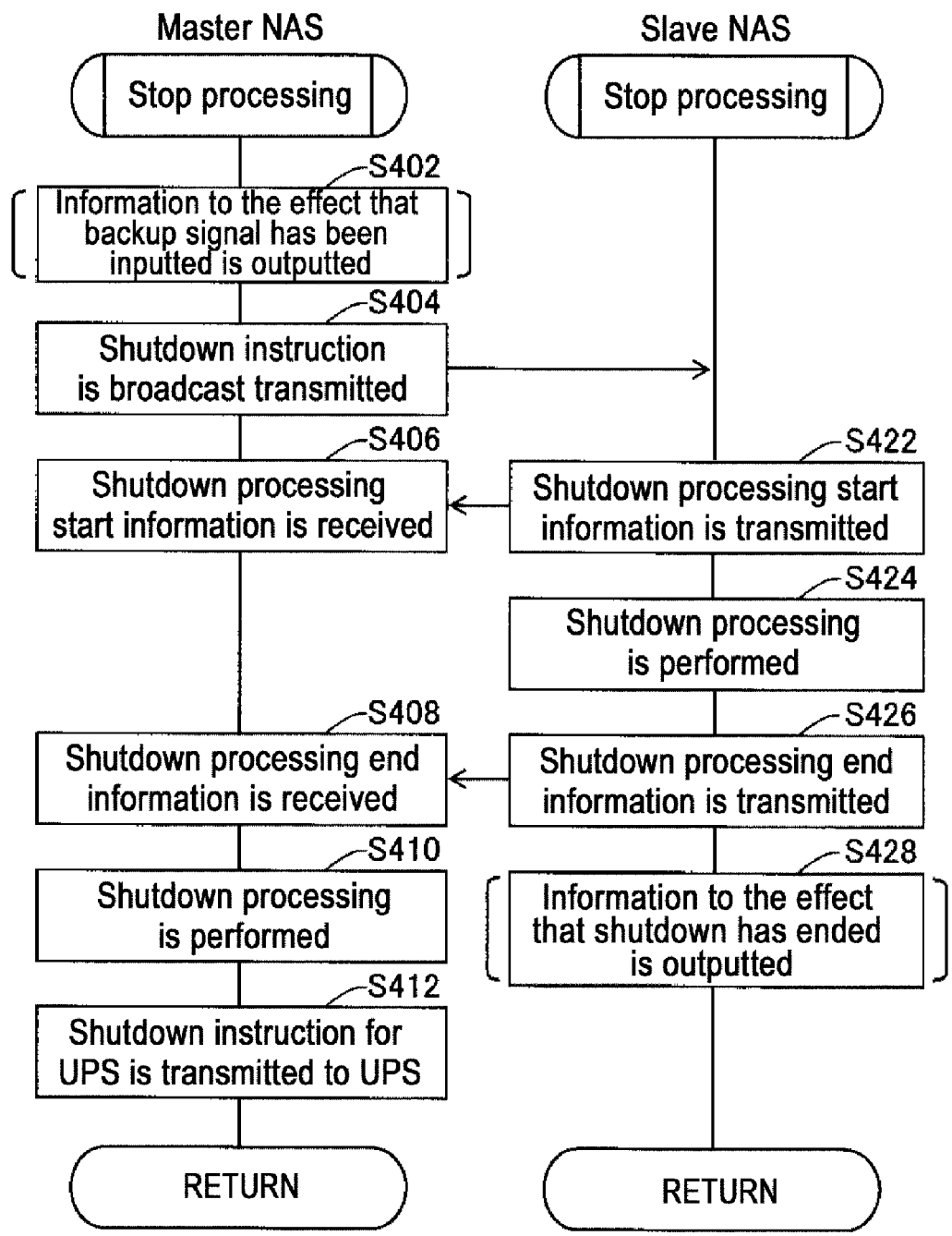
FIG. 15 is an exemplary illustration of a flowchart illustrating stop processing.

Furthermore, as shown in FIG. 15, the stop processing may be also performed by broadcast transmitting a shutdown instruction relating to the slave NAS.

Where the L-level BU signal is inputted from the power supply state signal generation circuit 162 of UPS, the master NAS 200 starts the main stop processing. In S402, information relating to the backup signal input is outputted to the outside. In S404, a shutdown instruction relating to slave NAS is outputted to the LAN by broadcast transmission in which data are transmitted to all the devices connected to the LAN.

When a shutdown instruction is inputted from the LAN, the slave NAS starts the stop processing and outputs the processing start information indicating the start of shutdown processing to the master NAS (S422). In the master NAS, the processing start information is received (S406). In the slave NAS, the shutdown processing is performed on the device itself (S424), processing end information indicating the end of shutdown processing is outputted to the master NAS (S426), information to the effect that the shutdown processing has ended is appropriately outputted to the outside (S428), and the stop processing is ended. The master NAS receives the processing start information, performs the shutdown processing on itself, outputs the L-level BS signal that instructs the UPS to shut down to the control signal input circuit of the UPS (S408 to S412), and ends the stop processing.

In the present modification example, it is not necessary to designate a network address and transmit information corresponding to the supply of backup power individually to slave NAS connected to the internal network. Therefore, the processing volume of master NAS can be reduced.

Figure 16:
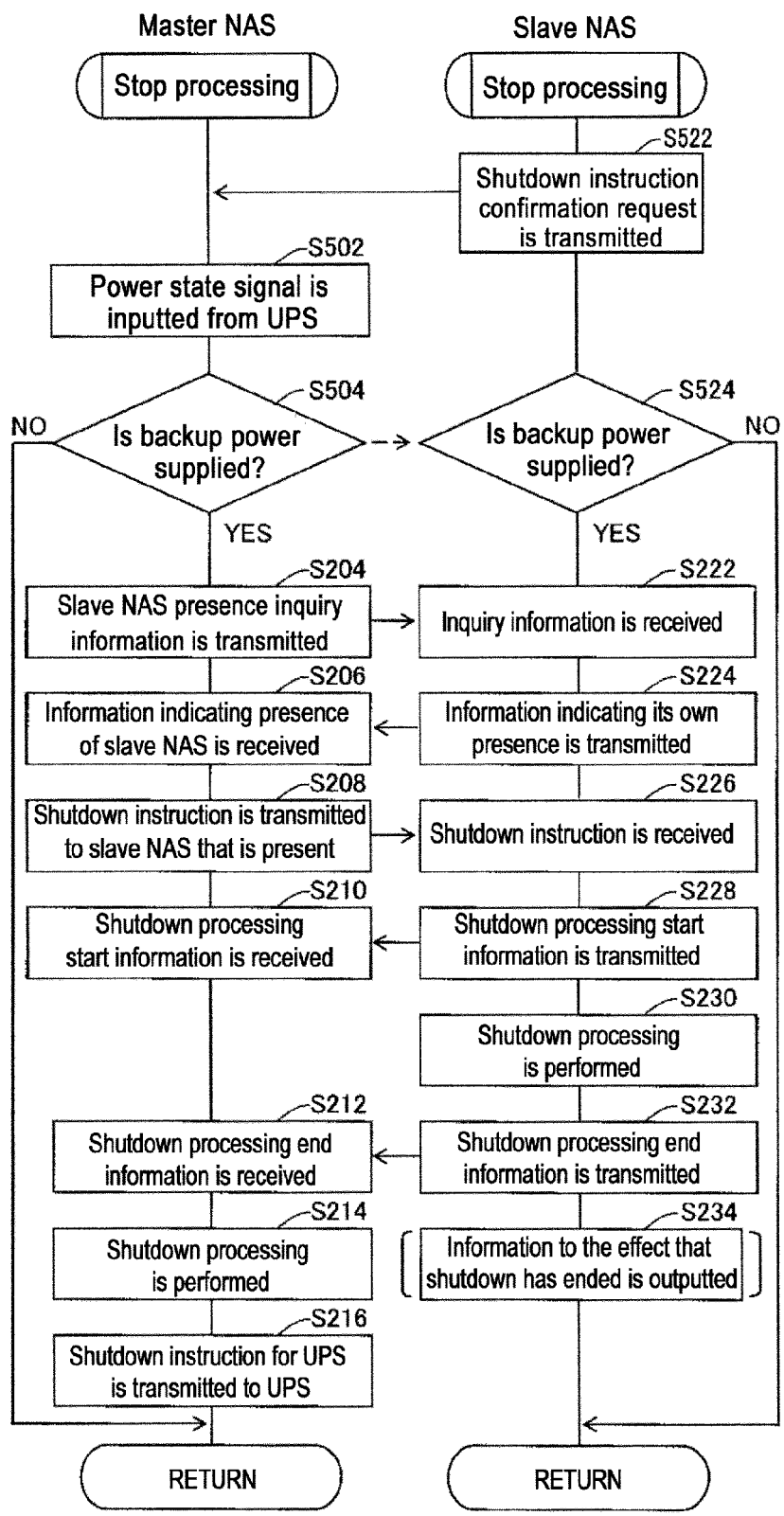
FIG. 16 is an exemplary illustration of a flowchart illustrating stop processing.

Furthermore, as shown in FIG. 16, it is also possible to perform the stop processing by inquiring from the slave NAS to the master NAS as to whether its own shutdown is necessary. In this case, the stop processing performed by the slave NAS is repeatedly performed with a predetermined interval (for example, a 5 min interval), for example, by an interruption processing using a timer circuit.

Where the slave NAS starts the stop processing, a shutdown instruction confirmation request is transmitted to the master NAS (S522).

Where the confirmation request is received, the master NAS starts the stop processing and inputs a power supply state signal (BU signal) from the power supply state signal generation circuit of the UPS (S502). In S504, it is determined whether UPS is in a state in which backup power is supplied and the determination result is transmitted to the slave NAS. This determination processing can be performed, for example, by reading the state of the BU signal from the I/O port. Further, in a case where the BU signal is at an L level, the condition is fulfilled and the processing of S204 to S216 is performed. In a case where the BU signal is at an H level, the condition is not fulfilled, and the stop processing ends. Therefore, the master NAS performs the shutdown processing on itself when the power supply state signal generation circuit of the UPS generates a signal of a state indicating the supply of backup power.

In the slave NAS, the aforementioned determination result is received and whether the UPS is in a state of supplying the backup power is determined on the basis of the determination result (S524). In a case where the BU signal is at an L level, the condition is fulfilled and the processing of S222 to S234 is performed. In a case where the BU signal is at an H level, the condition is not fulfilled and the stop processing ends.

In a case where the BU signal is at an L level, the master NAS, in brief, generates a shutdown instruction relating to the slave NAS, performs a shutdown processing on itself, performs a processing of outputting an L-level BS signal that instructs the shutdown to the UPS, and ends the stop processing. Meanwhile, the slave NAS, in brief, performs a shutdown processing on itself when the shutdown instruction is inputted from the LAN. Therefore, the slave NAS performs on itself the shutdown processing corresponding to a state in which backup power is supplied when a shutdown instruction is generated in the master NAS.

In the present modification example, the processing corresponding to a state in which backup power is supplied during commercial power supply interruption can be performed in the slave NAS and the slave NAS can be protected during commercial power supply interruption even in a case of using a master NAS that is not designed to output at all times the information to the effect that backup power is supplied from the UPS when such a supply is performed.

(3) Other Modification Examples

It is also possible that a slave NAS (second slave NAS) that is paired with a slave NAS (first slave NAS) be not connected to the internal network. In this case, the first slave NAS may generate a shutdown instruction (information corresponding to supply of backup power) that causes the execution of shutdown processing corresponding to a state in which backup power is supplied to the second slave NAS and may perform the shutdown processing on itself when a shutdown instruction (information corresponding to supply of backup power) is generated in the master NAS. The second slave NAS may perform the shutdown processing on itself when the shutdown instruction is generated in the first slave NAS. The storage device that executes the shutdown processing can also have a layered structure number of layers larger than that in the three-layer structure.

Furthermore, the master NAS and slave NAS may be connected by a special signal cable, for example, a serial signal cable such as a signal cable conforming to the USB standard and data transmission and reception between the above-described two NAS may be performed via the signal cable.

The PC 400 may also perform on itself a processing corresponding to a state in which backup power is supplied, in response to the input of the signal of the state indicating the supply of backup power from the power supply state signal generation circuit of the UPS to the master NAS. Furthermore, devices other than the NAS that are connected to the internal network may also perform on themselves a processing corresponding to the state in which backup power is supplied, in response to the input of the signal of the state indicating the supply of backup power from the power supply state signal generation circuit of the UPS to the master NAS. In this case, a device connected to the internal network may perform a stop processing similar to the stop processing of the slave NAS. As a result, the processing corresponding to a state in which backup power is supplied when the commercial power supply is interrupted can be also performed on a device in which the state in which backup power is supplied cannot be directly recognized from the UPS and this device can be protected when the commercial power supply is interrupted.

The present invention is not limited to the above-described embodiments and modification examples and also includes configurations obtained by mutual replacement or change in combinations of the features disclosed in the above-described embodiments and modification examples and configurations obtained by mutual replacement or change in combinations of the features disclosed in the above-described embodiments with well-known features.

Another aspect of the present invention provides a storage power supply system in which at least a first and a second storage device are coupled with a network and power at least from an uninterrupted power supply is supplied to the first and second storage devices, wherein the uninterrupted power supply is provided with a backup circuit that supplies backup power when commercial power supply is interrupted and a power supply state signal generation circuit that generates a signal indicating a state of supplied power;

the first storage device is coupled with the power supply state signal generation circuit and performs a self-processing corresponding to a state in which backup power is supplied when a signal of a state indicating the supply of backup power is inputted, this signal being generated by the power supply state signal generation circuit; and the second storage device performs a self-processing corresponding to a state in which backup power is supplied in response to the input of the signal of the state indicating the supply of backup power from the power supply state signal generation circuit to the first storage device.

Another aspect of the present invention provides a storage power supply system in which at least a first and a second storage device are coupled with a network and power at least from an uninterrupted power supply is supplied to the first and second storage devices, wherein the uninterrupted power supply is provided with a backup circuit that supplies backup power when commercial power supply is interrupted and a power supply state signal generation circuit that generates a power supply state signal indicating a state of supplied power;

the first storage device generates information corresponding to the supply of backup power thereto and performs a self-processing corresponding to a state in which backup power is supplied when the power supply state signal generated by the power supply state signal generation circuit is in a state indicating the supply of backup power; and the second storage device performs a self-processing corresponding to a state in which backup power is supplied when the information corresponding to the supply of backup power is generated by the first storage device.

Another aspect of the present invention provides a computer readable recording medium having recorded therein a control program of a slave storage device that is connected to a network having connected thereto a master storage device to which power is supplied from an uninterrupted power supply that has a power supply state signal generation circuit that generates a power supply state signal indicating a state of supplied power, wherein the computer is caused to realize a function of performing on the storage device itself a processing corresponding to a state in which backup power is supplied, in response to input of a backup state signal of a state indicating the supply of backup power from the power supply state signal generation circuit to the master storage device.

In the second storage device, the processing corresponding to the state in which backup power is supplied is performed in response to an input of a signal of a state indicating the supply of backup power from a power supply state signal generation circuit of the uninterrupted power supply to the first storage device.

Therefore, a processing corresponding to the state in which backup power is supplied during commercial power supply interruption can be also performed on the second storage device for which the state in which backup power is supplied cannot be directly recognized from the uninterrupted power supply, and the second storage device is protected during power supply interruption. In this case, where only the first and second storage devices are connected to the network, these storage devices are protected. Therefore, the storage device can be protected with a simple system configuration.

Furthermore, the first storage device may generate information corresponding to the supply of backup power thereto and perform a self-processing corresponding to the state in which backup power is supplied when the signal generated by the power supply state signal generation circuit is in a state indicating the supply of backup power, and the second storage device may perform a self-processing corresponding to the state in which backup power is supplied when the information corresponding to the supply of backup power is generated by the first storage device.

In the first storage device, information corresponding to backup power supply thereto is generated when the signal generated by the power supply state signal generation circuit of the uninterrupted power supply is in a state indicating the supply of backup power. In the second storage device, processing corresponding to the state in which backup power is supplied is performed when information corresponding to the backup power supply is generated by the first storage device. Therefore, the above-described effect can be obtained.

With the invention, the processing corresponding to the state in which backup power is supplied when commercial power supply is interrupted can be performed with a simple system configuration even with respect to the second storage device in which the state in which backup power is supplied cannot be directly recognized from the uninterrupted power supply, and the second storage device can be protected when commercial power supply is interrupted.

Another aspect of the present invention provides a computer readable recording medium having recorded therein a control program of a master storage device that is connected to a network having a slave storage device connected thereto and to which power is supplied from an uninterrupted power supply that has a power supply state signal generation circuit that generates a power supply state signal indicating a state of supplied power, wherein the computer is caused to realize a function of causing the slave storage device to execute a processing corresponding to a state in which backup power is supplied, and of performing on the storage device itself a processing corresponding to a state in which backup power is supplied when the power supply state signal generated by the power supply state signal generation circuit is in a state of indicating the supply of backup power.

In the aforementioned first storage device, a processing corresponding to the state in which backup power is supplied to the second storage device is executed when the signal generated by the power supply signal generation circuit of the uninterrupted power supply is in a state indicating the supply of backup power. As a result, in the second storage device, the processing corresponding to the state in which backup power is supplied is performed when the signal generated by the power supply state signal generation circuit indicates the supply of backup power. Therefore, the above-described effect is obtained.

With the invention, the processing corresponding to the state in which backup power is supplied can be performed with a simple signal configuration even with respect to the slave storage device in which the state in which backup power is supplied cannot be directly recognized from the uninterrupted power supply, and the slave storage device can be protected when commercial power supply is interrupted.

An optional aspect of the present invention provides the storage power supply system wherein the first storage device generates information corresponding to the supply of backup power to the first storage device and performs a self-processing corresponding to a state in which backup power is supplied when the backup state signal generated by the power supply state signal generation circuit is inputted; and the second storage device performs a self-processing corresponding to a state in which backup power is supplied when the information corresponding to the supply of backup power to the first storage device is generated by the first storage device.

With the invention, the processing corresponding to the state in which backup power is supplied can be easily performed on the second storage device.

Another optional aspect of the present invention provides the storage power supply system wherein the first storage device is connected by a signal cable to the power supply state signal generation circuit and outputs a shutdown instruction relating to the second storage device to the network and performs a shutdown processing on itself when the backup state signal is inputted via the signal cable from the power supply state signal generation circuit; and the second storage device performs a shutdown processing on itself when the shutdown instruction is inputted from the network.

With the invention, the shutdown processing can be performed when commercial power supply is interrupted even with respect to the second storage device in which a signal of the state indicating the supply of backup power cannot be directly inputted from the uninterrupted power supply, and the second storage device can be protected when commercial power supply is interrupted.

Another optional aspect of the present invention provides the storage power supply system wherein the first storage device outputs inquiry information for inquiring presence of the second storage device to the network when the backup state signal generated by the power supply state signal generation circuit is inputted;

the second storage device outputs presence information indicating the presence of the second storage device to the network when the inquiry information is inputted from the network;

the first storage device outputs information corresponding to the supply of backup power to the first storage device to the network and performs a self-processing corresponding to a state in which backup power is supplied when the presence information is inputted from the network; and the second storage device performs a self-processing corresponding to a state in which backup power is supplied when information corresponding to the supply of backup power to the first storage device is inputted from the network.

With the invention, the processing corresponding to the state in which backup power is supplied is performed in the first storage device after the presence of the second storage device connected to the network has been confirmed. Therefore, the second storage device can be protected more reliably.

Another optional aspect of the present invention provides the storage power supply system wherein the first storage device outputs information corresponding to the supply of backup power to the first storage device to the second storage device when the backup state signal generated by the power supply state signal generation circuit is inputted;

the second storage device outputs to the first storage device processing start information that indicates the start of a processing corresponding to the state in which backup power is supplied and performs the self-processing corresponding to the state in which backup power is supplied when information corresponding to the supply of backup power is inputted from the first storage device;

the first storage device performs a self-processing corresponding to the state in which backup power is supplied when the processing start information is inputted from the second storage device within a predetermined period after the information corresponding to the supply of backup power to the first storage device has been outputted to the second storage device; and the first storage device performs a processing of outputting the information corresponding to the supply of backup power to the second storage device again a number of times within a predetermined upper limit number of times when the processing start information is not inputted from the second storage device within the predetermined period, and performs a self-processing corresponding to the state in which backup power is supplied when the processing start information is not inputted from the second storage device within the predetermined period after the output processing has been performed the upper limit number of times.

With the invention, the processing corresponding to the state in which backup power is supplied can be reliably performed in the first storage device even in a case where the second storage device does not respond. Therefore, the first storage device can be protected more reliably.

Another optional aspect of the present invention provides the storage power supply system wherein
the uninterrupted power supply comprises a control signal input circuit that inputs signals for controlling operation of the uninterrupted power supply;
the uninterrupted power supply stops the supply of backup power when a backup stop signal that causes the supply of backup power to stop is inputted to the control signal input circuit;
the first storage device is connected to the control signal input circuit; and
the first storage device causes the uninterrupted power supply to stop the supply of backup power after the processing corresponding to the state in which backup power is supplied has been performed on the first storage device by outputting the backup stop signal to the control signal input circuit.

With the invention, the supply source of backup power of the uninterrupted power supply can be protected, while protecting the storage device.

Another optional aspect of the present invention provides the storage power supply system wherein
the uninterrupted power supply comprises a control signal input circuit that inputs signals for controlling operation of the uninterrupted power supply;
the uninterrupted power supply stops the supply of backup power when a backup stop signal that causes the supply of backup power to stop is inputted to the control signal input circuit;
the first storage device is connected to the control signal input circuit;
the first storage device causes the uninterrupted power supply to stop the supply of backup power after the processing corresponding to the state in which backup power is supplied has been performed on the first storage device by outputting the backup stop signal to the control signal input circuit when the processing start information is inputted from the second storage device within the predetermined period after the information corresponding to the supply of backup power to the first storage device has been outputted to the second storage device; and
the first storage device performs a self-processing corresponding to the state in which backup power is supplied, without outputting the backup stop signal to the control signal input circuit, when the processing start information is not inputted from the second storage device within the predetermined period after the processing of outputting the information corresponding to the supply of backup power to the first storage device to the second storage time has been performed again the upper limit number of times when the processing start information is not inputted from the second storage device within the predetermined period.

With the invention, the supply of backup power of the uninterrupted power supply is not stopped in a case where the second storage device does not respond. Therefore, the second storage device can be protected more reliably.

Another optional aspect of the present invention provides the storage power supply system wherein
the uninterrupted power supply comprises a control signal input circuit that inputs a signal for controlling operation of the uninterrupted power supply;
the uninterrupted power supply stops the supply of backup power when a backup stop signal that causes the supply of backup power to stop is inputted to the control signal input circuit;
the first storage device is connected by the same signal cable to the power supply state signal generation circuit and the control signal input circuit;
the first storage device outputs inquiry information for inquiring presence of the second storage device to the network when the backup state signal is inputted from the power supply state signal generation circuit via the signal cable;
the second storage device outputs presence information indicating the presence of the second storage device to the network when the inquiry information is inputted from the network;
the first storage device outputs to the network a shutdown instruction relating to the second storage device when the presence information is inputted from the network;
the second storage device outputs processing start information that indicates a shutdown processing start to the network and performs a shutdown processing on itself when the shutdown instruction is inputted from the network; and
the first storage device causes the uninterrupted power supply to stop the supply of backup power after the shutdown processing has been performed on itself by outputting the backup stop signal to the control signal input circuit via the signal cable when the processing start information is inputted from the network within a predetermined period after the shutdown instruction relating to the second storage device has been outputted to the network, while performs a processing of outputting information corresponding to the supply of backup power again a predetermined upper limit number of times when the processing start information is not inputted from the network within the predetermined period, and performs the shutdown processing on itself without outputting the backup stop signal to the control signal input circuit via the signal cable when the processing start information is not inputted from the network within the predetermined period after the output processing has been performed the upper limit number of times.

With the invention, the shutdown processing can be adequately performed when commercial power supply is interrupted even with respect to the second storage device into which the state in which backup power is supplied cannot be directly inputted from the uninterrupted power supply, and the second storage device can be adequately protected when commercial power supply is interrupted.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A storage power supply system, comprising:
a first storage device coupled with a network;
a second storage device coupled with the network; and
an uninterrupted power supply that supplies power to the first storage device and the second storage device;
the uninterrupted power supply comprises a backup circuit that supplies backup power when commercial power supply is interrupted;
the uninterrupted power supply comprises a power supply state signal generation circuit that generates a power supply state signal indicating a state of the power;
the power supply state signal includes a backup state signal indicating a supply of backup power;
the first storage device is coupled with the power supply state signal generation circuit;
the first storage device outputs information corresponding to the supply of backup power to the second storage device when the backup state signal generated by the power supply state signal generation circuit is inputted;
the second storage device outputs to the first storage device processing start information that indicates the start of a processing corresponding to the state in which backup power is supplied and performs a self-processing corresponding to a state in which backup power is supplied when the information corresponding to the supply of backup power is inputted from the first storage device; and
the first storage device causes the uninterrupted power supply to stop the supply of backup power after a self-processing corresponding to the state in which backup power is supplied has been performed when the processing start information is inputted from the second storage device, while performs a self-processing corresponding to the state in which backup power is supplied without causing the supply of backup power to stop to the uninterrupted power supply when the processing start information is not inputted from the second storage device.

2. The storage power supply system according to claim 1, wherein
the first storage device is connected by a signal cable to the power supply state signal generation circuit and outputs a shutdown instruction relating to the second storage device to the network and performs a shutdown processing on itself when the backup state signal is inputted via the signal cable from the power supply state signal generation circuit; and
the second storage device performs a shutdown processing on itself when the shutdown instruction is inputted from the network.

3. The storage power supply system according to claim 1, wherein
the first storage device outputs inquiry information for inquiring presence of the second storage device to the network when the backup state signal generated by the power supply state signal generation circuit is inputted;
the second storage device outputs presence information indicating the presence of the second storage device to the network when the inquiry information is inputted from the network; and
the first storage device outputs information corresponding to the supply of backup power to the network when the presence information is inputted from the network.

4. The storage power supply system according to claim 1, wherein
the first storage device performs a self-processing corresponding to the state in which backup power is supplied when the processing start information is inputted from the second storage device within a predetermined period after the information corresponding to the supply of backup power has been outputted to the second storage device; and
the first storage device performs a processing of outputting the information corresponding to the supply of backup power to the second storage device again a number of times within a predetermined upper limit number of times when the processing start information is not inputted from the second storage device within the predetermined period, and performs a self-processing corresponding to the state in which backup power is supplied when the processing start information is not inputted from the second storage device within the predetermined period after the output processing has been performed the upper limit number of times.

5. The storage power supply system according to claim 4, wherein
the uninterrupted power supply comprises a control signal input circuit that inputs signals for controlling operation of the uninterrupted power supply;
the uninterrupted power supply stops the supply of backup power when a backup stop signal that causes the supply of backup power to stop is inputted to the control signal input circuit;
the first storage device is coupled with the control signal input circuit;
the first storage device causes the uninterrupted power supply to stop the supply of backup power after the processing corresponding to the state in which backup power is supplied has been performed on the first storage device by outputting the backup stop signal to the control signal input circuit when the processing start information is inputted from the second storage device within the predetermined period after the information corresponding to the supply of backup power has been outputted to the second storage device; and
the first storage device performs a self-processing corresponding to the state in which backup power is supplied, without outputting the backup stop signal to the control signal input circuit, when the processing start information is not inputted from the second storage device within the predetermined period after the processing of outputting the information corresponding to the supply of backup power to the second storage time has been performed again the upper limit number of times when the processing start information is not inputted from the second storage device within the predetermined period.

6. The storage power supply system according to claim 1, wherein
the uninterrupted power supply comprises a control signal input circuit that inputs signals for controlling operation of the uninterrupted power supply;
the uninterrupted power supply stops the supply of backup power when a backup stop signal that causes the supply of backup power to stop is inputted to the control signal input circuit;
the first storage device is coupled with the control signal input circuit; and
when the first storage device causes the uninterrupted power supply to stop the supply of backup power, the first storage device outputs the backup stop signal to the control signal input circuit.

7. The storage power supply system according to claim 1, wherein the uninterrupted power supply comprises a control signal input circuit that inputs a signal for controlling operation of the uninterrupted power supply;

the uninterrupted power supply stops the supply of backup power when a backup stop signal that causes the supply of backup power to stop is inputted to the control signal input circuit;

the first storage device is connected by the same signal cable to the power supply state signal generation circuit and the control signal input circuit;

the first storage device outputs inquiry information for inquiring presence of the second storage device to the network when the backup state signal is inputted from the power supply state signal generation circuit via the signal cable;

the second storage device outputs presence information indicating the presence of the second storage device to the network when the inquiry information is inputted from the network;

the first storage device outputs to the network a shutdown instruction relating to the second storage device when the presence information is inputted from the network;

the second storage device outputs processing start information that indicates a shutdown processing start to the network and performs a shutdown processing on itself when the shutdown instruction is inputted from the network; and the first storage device causes the uninterrupted power supply to stop the supply of backup power after the shutdown processing has been performed on itself by outputting the backup stop signal to the control signal input circuit via the signal cable when the processing start information is inputted from the network within a predetermined period after the shutdown instruction relating to the second storage device has been outputted to the network, while performs a processing of outputting the shutdown instruction again a predetermined upper limit number of times when the processing start information is not inputted from the network within the predetermined period, and performs the shutdown processing on itself without outputting the backup stop signal to the control signal input circuit via the signal cable when the processing start information is not inputted from the network within the predetermined period after the output processing has been performed the upper limit number of times.

8. A master storage device that is coupled with a network having a slave storage device coupled with the network, comprising:

the master storage device receives power supply from an uninterrupted power supply that has a power supply state signal generation circuit that generates a power supply state signal indicating a state of supplied power; when the power supply state signal generated by the power supply state signal generation circuit is in a state indicating the supply of backup power, the master storage device outputs information corresponding to the supply of backup power to the slave storage device, and causes the uninterrupted power supply to stop the supply of backup power after the processing corresponding to the state in which backup power is supplied has been performed on the master storage device when processing start information that indicates the start of a processing corresponding to the state in which backup power is supplied is inputted from the slave storage device, while performs a self-processing corresponding to the state in which backup power is supplied without causing the supply of backup power to stop to the uninterrupted power supply when the processing start information is not inputted from the slave storage device.

9. A control method for a master storage device that is coupled with a network having a slave storage device coupled with the network and receives power supply from an uninterrupted power supply that has a power supply state signal generation circuit that generates a power supply state signal indicating a state of supplied power, wherein, when the power supply state signal generated by the power supply state signal generation circuit is in a state indicating the supply of backup power, the master storage device outputs information corresponding to the supply of backup power to the slave storage device, and causes the uninterrupted power supply to stop the supply of backup power after the processing corresponding to the state in which backup power is supplied has been performed on the master storage device when processing start information that indicates the start of a processing corresponding to the state in which backup power is supplied is inputted from the slave storage device, while performs a self-processing corresponding to the state in which backup power is supplied without causing the supply of backup power to stop to the uninterrupted power supply when the processing start information is not inputted from the slave storage device.

* * * * *